US010726510B2

(12) United States Patent
Vanslette et al.

(10) Patent No.: US 10,726,510 B2
(45) Date of Patent: Jul. 28, 2020

(54) SYSTEM AND METHOD FOR MANAGING AND INTERACTING WITH PATRONS AT AN ACTIVITY VENUE

(71) Applicant: FAIRWAYIQ, INC., Waltham, MA (US)

(72) Inventors: David J. Vanslette, Wayland, MA (US); James K. B. Nunn, Wayland, MA (US); Lucius Riccio, New York, NY (US); Miro Jelicic, Brookline, MA (US)

(73) Assignee: FairwayIQ, Inc., Waltham, MA (US)

( * ) Notice: Subject to any disclaimer, the term of this patent is extended or adjusted under 35 U.S.C. 154(b) by 876 days.

(21) Appl. No.: 15/229,415

(22) Filed: Aug. 5, 2016

(65) Prior Publication Data

US 2017/0039661 A1 Feb. 9, 2017

Related U.S. Application Data

(60) Provisional application No. 62/202,502, filed on Aug. 7, 2015, provisional application No. 62/232,744, filed
(Continued)

(51) Int. Cl.
*G06Q 50/16* (2012.01)
*H04W 4/02* (2018.01)
(Continued)

(52) U.S. Cl.
CPC ......... *G06Q 50/163* (2013.01); *G06Q 10/067* (2013.01); *G06Q 10/06312* (2013.01);
(Continued)

(58) Field of Classification Search
CPC ........... H04W 4/21; H04W 4/23; H04W 4/29; H04W 88/16
See application file for complete search history.

(56) References Cited

U.S. PATENT DOCUMENTS 4,905,624 A 3/1990 Krolzick
4,926,161 A 5/1990 Cupp
(Continued)

FOREIGN PATENT DOCUMENTS

CN 105091911 11/2015
GB 2532999 6/2016
(Continued)

OTHER PUBLICATIONS

International Search Report and Written Opinion from PCT/US2016/045732, dated Dec. 2, 2016.
(Continued)

*Primary Examiner* — Matthew S Gart
*Assistant Examiner* — Stephen S Swartz
(74) *Attorney, Agent, or Firm* — Morse, Barnes-Brown & Pendleton, P.C.; Sean D. Detweiler, Esq.

(57) ABSTRACT

A technologically improved system and corresponding method of operation tracks and manages activities and tasks occurring at an activity venue. In particular, the system operates to track locations and pace of play or participation of the patrons at the activity venue and through various improved technological processes and interactions enabled by the unique hardware of the system, provide the patrons with feedback to manage their locations for an improved participation experience. Furthermore, the system leverages collected information and data to enable live traffic control of the patrons, provide predictive analytics related to game-play and flow of traffic, and provide operators and patrons with information necessary to maximize a pace of place while optimally maintaining the venue around the patrons without interruption to the patrons and thereby improve the experience of the patrons at the activity venue.

31 Claims, 12 Drawing Sheets

Related U.S. Application Data on Sep. 25, 2015, provisional application No. 62/338,836, filed on May 19, 2016, provisional application No. 62/352,548, filed on Jun. 20, 2016.

(51) Int. Cl.
| | |
|---|---|
| *H04W 4/021* | (2018.01) |
| *G06Q 10/06* | (2012.01) |
| *G06Q 10/00* | (2012.01) |
| *G06Q 50/10* | (2012.01) |
| *H04W 88/16* | (2009.01) |

(52) U.S. Cl.
CPC ............ *G06Q 10/20* (2013.01); *G06Q 50/10* (2013.01); *H04W 4/021* (2013.01); *H04W 4/023* (2013.01); *H04W 88/16* (2013.01)

(56) References Cited

U.S. PATENT DOCUMENTS

| | | |
|---|---|---|
| 5,086,390 A | 2/1992 | Matthews |
| 5,097,416 A | 3/1992 | Matthews |
| 5,305,201 A | 4/1994 | Matthews |
| 5,524,081 A | 6/1996 | Paul |
| 5,689,431 A | 11/1997 | Rudow et al. |
| 5,878,369 A | 3/1999 | Rudow et al. |
| 6,062,991 A | 5/2000 | Moriarty et al. |
| 6,102,817 A | 8/2000 | Boswell |
| 6,236,360 B1 | 5/2001 | Rudow et al. |
| 6,236,940 B1 | 5/2001 | Rudow et al. |
| 6,346,055 B1 | 2/2002 | Rege |
| 6,470,242 B1 | 10/2002 | Rudow et al. |
| 6,525,690 B2 | 2/2003 | Rudow et al. |
| 6,636,296 B1 | 10/2003 | Faulkner et al. |
| 7,137,100 B2 | 11/2006 | Iborra et al. |
| 7,242,294 B2 | 7/2007 | Warrior et al. |
| 7,339,478 B2 | 3/2008 | Le |
| 7,855,638 B2 | 12/2010 | Huston et al. |
| 7,856,360 B2 | 12/2010 | Kramer et al. |
| 7,862,414 B2 | 1/2011 | Doaga et al. |
| 8,083,617 B2 | 12/2011 | Greenquist et al. |
| 8,517,850 B1 | 8/2013 | Beno et al. |
| 8,738,036 B1 | 5/2014 | Boyle et al. |
| 8,903,588 B2 | 12/2014 | Schmudderich et al. |
| 9,135,269 B2 | 9/2015 | Shetty et al. |
| 9,180,350 B2 | 11/2015 | Pringle et al. |
| 9,307,385 B2 | 4/2016 | Best |
| 2001/0045904 A1 | 11/2001 | Silzer, Jr. |
| 2002/0016674 A1* | 2/2002 | Rudow ............ A63B 24/0021 701/470 |
| 2002/0072815 A1 | 6/2002 | McDonough et al. |
| 2002/0188359 A1 | 12/2002 | Morse |
| 2003/0036936 A1 | 2/2003 | Steichen et al. |
| 2003/0191547 A1 | 10/2003 | Morse |
| 2004/0092311 A1* | 5/2004 | Weston .................. A63F 13/10 463/42 |
| 2004/0172316 A1 | 9/2004 | Hale et al. |
| 2004/0243262 A1* | 12/2004 | Hofmann ............ A63B 71/0605 700/91 |
| 2005/0003811 A1 | 1/2005 | Hale et al. |
| 2005/0057370 A1 | 3/2005 | Warrior et al. |
| 2006/0178110 A1 | 8/2006 | Nurminen et al. |
| 2006/0240838 A1 | 10/2006 | Suh et al. |
| 2006/0276173 A1 | 12/2006 | Srey et al. |
| 2007/0008884 A1 | 1/2007 | Tang |
| 2007/0138268 A1 | 6/2007 | Tuchman |
| 2007/0171394 A1 | 7/2007 | Steiner et al. |
| 2008/0088462 A1* | 4/2008 | Breed ................... B60C 11/24 340/573.1 |
| 2008/0102956 A1* | 5/2008 | Burman ............ G06Q 20/3224 463/42 |
| 2008/0250478 A1 | 10/2008 | Miller et al. |
| 2009/0036237 A1* | 2/2009 | Nipper .............. A63B 24/0021 473/409 |
| 2009/0070694 A1 | 3/2009 | Ore et al. |
| 2009/0092111 A1 | 4/2009 | Horn et al. |
| 2009/0111602 A1 | 4/2009 | Savarese et al. |
| 2009/0138303 A1 | 5/2009 | Seshadri |
| 2009/0210263 A1 | 8/2009 | Smeenge et al. |
| 2009/0268631 A1 | 10/2009 | Li et al. |
| 2009/0319306 A1* | 12/2009 | Chanick ............. G01C 21/3679 705/5 |
| 2010/0121701 A1 | 5/2010 | Nguyen et al. |
| 2011/0022226 A1* | 1/2011 | Petersen ............. B60H 1/00407 700/237 |
| 2011/0230276 A1* | 9/2011 | Balardeta ........... A63B 69/3623 473/222 |
| 2011/0304460 A1* | 12/2011 | Keecheril ............ G06Q 10/087 340/572.1 |
| 2011/0314145 A1 | 12/2011 | Raleigh et al. |
| 2012/0004956 A1 | 1/2012 | Huston et al. |
| 2012/0037725 A1* | 2/2012 | Verfuerth ............... A01G 25/16 239/289 |
| 2012/0089271 A1 | 4/2012 | Silzer, Sr. et al. |
| 2012/0249330 A1* | 10/2012 | Savarese ........... A63B 71/0669 340/568.6 |
| 2012/0264544 A1* | 10/2012 | Meadows ............... G01S 19/19 473/407 |
| 2012/0278721 A1 | 11/2012 | Beidel |
| 2012/0289354 A1 | 11/2012 | Cottam et al. |
| 2013/0006588 A1* | 1/2013 | Mulligan .............. G06F 17/509 703/1 |
| 2013/0144411 A1* | 6/2013 | Savarese ................ G06F 17/40 700/91 |
| 2013/0178311 A1 | 7/2013 | Peterson |
| 2013/0217519 A1 | 8/2013 | Cottam et al. |
| 2014/0011603 A1 | 1/2014 | Pennington |
| 2014/0068681 A1 | 3/2014 | Lemmey et al. |
| 2014/0089243 A1* | 3/2014 | Oppenheimer .... G06K 7/10009 706/46 |
| 2014/0114454 A1* | 4/2014 | Moran .................... A63B 69/36 700/91 |
| 2014/0257926 A1 | 9/2014 | Rasband |
| 2014/0274155 A1* | 9/2014 | Langberg ................ H04W 4/02 455/456.3 |
| 2014/0277627 A1 | 9/2014 | Bastawros |
| 2014/0278688 A1 | 9/2014 | Sullivan |
| 2014/0329613 A1 | 11/2014 | Savarese et al. |
| 2014/0339110 A1 | 11/2014 | Soracco |
| 2014/0365639 A1* | 12/2014 | Wohl .................. G06F 16/9537 709/224 |
| 2014/0379105 A1* | 12/2014 | Glasson ............. G07F 17/3237 700/91 |
| 2015/0065271 A1 | 3/2015 | Peterson |
| 2015/0231460 A1* | 8/2015 | Pringle .................. A63B 57/00 340/568.6 |
| 2015/0262200 A1 | 9/2015 | Fredette |
| 2015/0301174 A1 | 10/2015 | Hellickson et al. |
| 2016/0092880 A1 | 3/2016 | Klingen |
| 2016/0094268 A1 | 3/2016 | Seller |
| 2016/0129332 A1 | 5/2016 | Davenport |
| 2016/0166902 A1 | 6/2016 | Day et al. |
| 2017/0132648 A1 | 5/2017 | DeLuca et al. |

FOREIGN PATENT DOCUMENTS

| | | |
|---|---|---|
| WO | WO 93/00641 | 1/1993 |
| WO | WO 2000/014688 A1 | 3/2000 |
| WO | WO 2009/068561 A2 | 6/2009 |
| WO | WO 2011/031714 A1 | 3/2011 |
| WO | WO 2015/099387 A1 | 7/2015 |
| WO | WO 2016/107646 A1 | 7/2016 |
| WO | WO 2017/027360 A1 | 2/2017 |

OTHER PUBLICATIONS

Notice of Allowance from U.S. Appl. No. 14/217,319, dated Jan. 25, 2017.
http://pacemanager.com/ Website accessed on Nov. 15, 2016.
http://tagmarshal.com/ Website accessed on Nov. 15, 2016.
http://www.golfswell.com/ Website accessed on Nov. 15, 2016.
http://www.visagegolf.com/ Website accessed on Nov. 15, 2016.

(56) References Cited

OTHER PUBLICATIONS http://www.carttrac.com/ Website accessed on Nov. 15, 2016.
http://www.stayprime.com/wp/ Website accessed on Nov. 15, 2016.
Non-Final Office Action from U.S. Appl. No. 14/217,319, dated Apr. 27, 2016.
Final Office Action from U.S. Appl. No. 14/217,319, dated Oct. 18, 2016.
Supplementary European Search Report from EP Application No. 16 83 5685; dated Dec. 11, 2018.
Non-Final Office Action from U.S. Appl. No. 15/667,449, dated Aug. 22, 2019.
International Search Report from PCT/US2017/045170, dated Oct. 17, 2017.
Final Office Action from U.S. Appl. No. 15/667,449, dated Feb. 21, 2020.

* cited by examiner

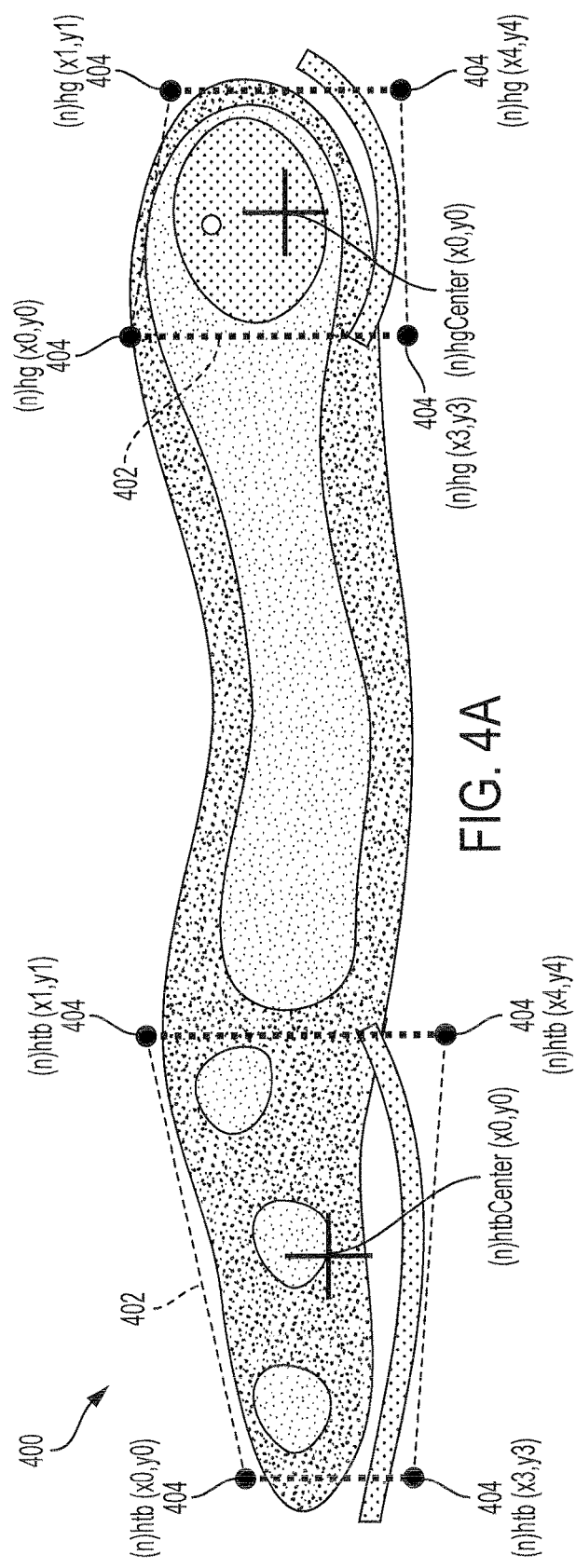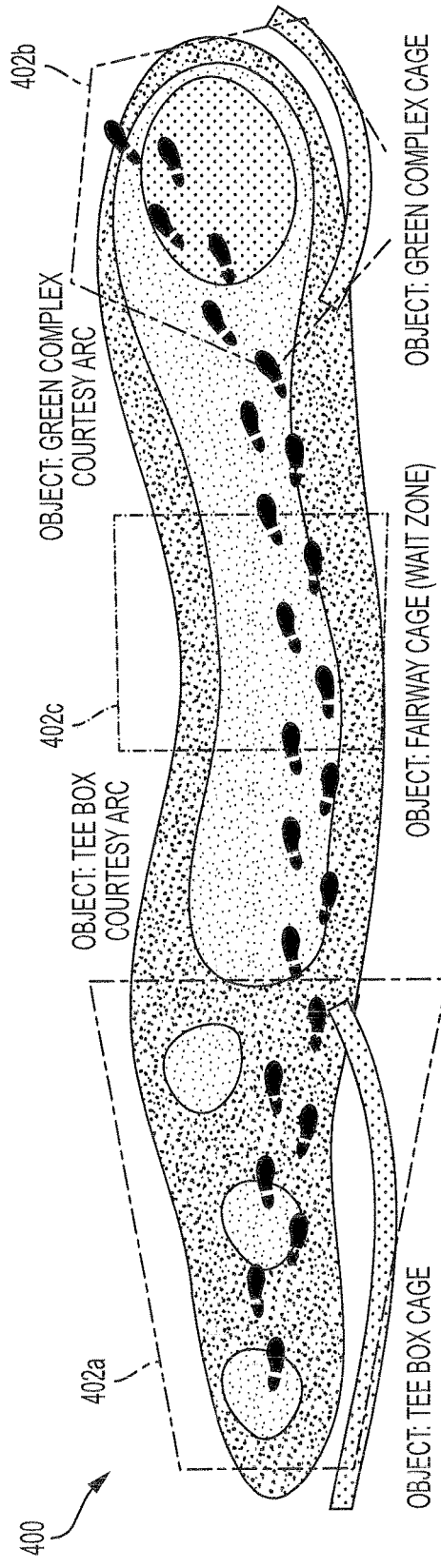
FIG. 4A
FIG. 4B

SYSTEM AND METHOD FOR MANAGING AND INTERACTING WITH PATRONS AT AN ACTIVITY VENUE

CROSS-REFERENCE TO RELATED APPLICATION(S)

This application claims priority to and the benefit of U.S. Provisional Application 62/202,502, filed Aug. 7, 2015, U.S. Provisional Application 62/232,744, filed Sep. 25, 2015, U.S. Provisional Application 62/338,836, filed May 19, 2016, and U.S. Provisional Application 62/352,548, filed Jun. 20, 2016 for all subject matter contained in said applications. The disclosures of all said provisional applications are hereby incorporated by reference in their entirety.

FIELD OF THE INVENTION

The present invention relates to addressing managing a plurality of patrons at an activity venue by implementing a technological solution that improves an experience of the patrons at the activity venue. In particular, the present invention relates to a system that operates to track locations and pace of play or participation, e.g. time, of the patrons at the activity venue and through various improved technological processes and interactions enabled by the unique technological hardware of the system, provide the patrons with feedback to manage their locations for an improved participation experience.

BACKGROUND

Generally, activity venues make a profit by providing entertainment to a maximum number of patrons over a period of time. Typically, patrons can arrive at an activity venue and pay a fee to participate in an activity for a period of time or for a predetermined quantity of sub-activities. For example, golfers can reserve a scheduled tee time to play a round of golf at a golf course. Traditionally, tee times are assigned to patrons using a predicted offset of time to create an offset between golfing parties (e.g., 15 minute increments). Tee times can be assigned, by reservation or by walk-in, on a first come first served basis for time slots that are available at the time of reservation. Other activity venues schedule their activities for patrons based on similar scheduling systems or simply using a first come first served queue (e.g., at venues providing entertainment related to mini golf, skiing, amusement parks, etc.).

However, these methodologies experience some shortcomings. The use of scheduled predetermined time slots or first come first served type queues can make it difficult for operators to manage a flow of patrons at periods of high volume (e.g., summer months, weekends, Friday night, etc.) and make it difficult for patrons to accurately predict the amount of time it will take to complete their activities at the venue. In other words, traditional methodologies do not take into account current traffic flow of the patrons throughout the entire venue and do not compensate for bottlenecks causing extended wait times or gaps that could be filled by patrons that otherwise would be waiting to participate. For example, the first come first served model merely places patrons at an initial starting point (e.g., at the first hole of a golf course) upon their arrival at the activity venue, which can lead to backups and extended wait times while patrons wait for the group(s) in front of them to finish the current sub-activity (i.e., the first hole of a three, nine, or eighteen hole golf course). Similarly, predetermined time slots can cause unnecessary delays or large time gaps based on a time of day, week, or month. For example, time slots for early afternoon on a weekday may not be as convenient for patrons as the time slots for weekend afternoons, causing large swings in the number of people on a course at any one time. Additionally, these conventional methods lack the tools necessary to track data related to the traffic of patrons and to use the data to maximize the throughput of the patrons. Instead, any adjustments made by operators at an activity venue rely solely upon in-person observations of the activities and patrons, and making the adjustments according to such in-person observations. Likewise, the adjustments that can be done based on such in-person observations are insufficient to address the existing shortcomings of such methodologies.

Moreover, today's culture and lifestyles have changed, leaving less leisure time, which must be balanced against other priorities. Younger generations expect a lifestyle that is managed digitally in real-time. Accordingly, activity venues that are not optimized for efficiency to meet today's demands and/or are not able to offer expedited entertainment for patrons, can suffer financial losses. For example, in today's culture, golfers are finding it increasingly difficult to play golf because rounds could last over 4 hours 15 minutes, which is too much of a time commitment. Conventional golf courses lack a means to convey to golfers how long a round of golf will take for them to complete, making it difficult to schedule a round of golf in condensed schedules. Similarly, in addition to an expedited entertainment experience, patrons want more budget friendly options to fit their schedules. For example, a golfer may only have time to play golf for 90 minutes, which may only be enough to play 6 holes, but they do not want to have to pay for a full 9 or 18 holes (and it is unconventional to be able to pay for a number of holes at a full size golf course that is less than 9 holes). Problems similar to the above-noted issues can lead to patron frustration, hindering in the overall experience, a decrease in new players, and an overall decline in the number of participating patrons at the venue. Further, during extremely slow times, a golfer may want to play a particular hole multiple times to practice a skill required to effectively play a challenging part of the course, such as laying up in front of a hazard, clearing an obstacle, or finding the best approach to executing a curved fairway, typically referred to as a "dog leg". This type of flexibility and individualized billing is impossible with current activity models.

Additionally, during periods of high volume of patrons, it is difficult for the staff to maintain the venue around patrons. Typically the staff is inefficient as they have to wait to perform maintenance tasks in between patron use. At large venues like golf courses, performing maintenance between patrons is extremely challenging because it is unclear where all of the patrons are at any given moment. Consequently, staff spend time waiting for patrons to complete sub-activities within the activity venue (such as a particular hole on a golf course). Likewise, patrons do not enjoy staff waiting for them to complete such sub-activities because it diminishes their experience. This also results in both time and cost inefficiencies.

Maintenance superintendents who manage staff at large venues also have difficulty doing so efficiently. They do not always know where the staff is physically located at the venue or the amount of time they spend in areas performing certain tasks. Superintendents also frequently do not know where each piece of equipment is at any moment and must coordinate equipment usage through inefficient methods.

This yields inefficiencies for the venue in time and cost and ultimately the delivery of a consistent experience for patrons.

SUMMARY

There is a need for a technological solution providing a management tool that enables an improved experience for patrons at an activity venue and allows more time and cost efficient ways to manage/maintain a venue. The present invention is directed toward further solutions to address this need, in addition to having other desirable characteristics. Specifically, there is a need for a technological solution that obtains data and tracks patrons within an activity venue in such a way that enables real-time control of the patrons and their participation in activities, provides predictive analytics related to gameplay and flow of traffic, and provides operators and patrons with information necessary to maximize a pace of play and thereby improve the experience of the patrons at the activity venue. Moreover, there is a need for a technological solution that maximizes a number or throughput of patrons paying to participate at the activity venue to increase revenue for the activity venue. In particular, there is a need for a technological solution that builds a connected venue to grow operator revenue and make the activity more accessible to all patrons. For example, connection of staff, maintenance equipment, patrons, and the like, is needed in order to orchestrate and manage large venues effectively and efficiently. Overall, there is a need to provide a technological solution to maximize patron experiences while not intruding on the ability to participate in the activities themselves.

Embodied in the present invention is a technological solution to the stated shortcomings of the prior and conventional systems, and in some instances the lack of any system, process, or capability altogether. Specifically, in accordance with an embodiment of the present invention, a system for managing a plurality of patrons of an activity venue, the activity venue including a plurality of sub-activities, is provided. Each sub-activity of the plurality of sub-activities has a point of access for the plurality of patrons to embark on the sub-activity and the point of access is recognized by the system. The system also includes a plurality of patron sensor devices for disposition and transportation throughout the activity venue by the plurality of patrons, each of the plurality of patron sensor devices includes a location sensor configured to provide real-time location data indicating the location of the plurality of patron sensor devices within the activity venue and a wireless communication device for communication with the wireless gateway, the communication including receiving the real-time location data from the plurality of patron sensor devices, enabling the system to establish the real-time location of each of the plurality of patron sensor devices within the activity venue. The system further includes a computing device in communication with the wireless gateway, the computing device executing a tracking tool that receives the real-time location data for each of the plurality of patron sensor devices via the wireless gateway and transforms the real-time location data into predictive data indicating anticipated locations of each of the plurality of patron sensor devices within the activity venue at future times.

In accordance with an illustrative embodiment of the present invention, the activity venue is a golf course, the plurality of sub-activities are holes on the golf course, and the plurality of patrons are golfers on the golf course. In accordance with aspects of the present invention, the computing device provides information related to at least one of: sub-activity time management, participant matching, live traffic control, statistics related to the tracked movements of the plurality of patrons, predictive analytics of the plurality of patrons, layout of the activity venue, and maintenance of the activity venue to at least an operator of the activity venue. In accordance with aspects of the present invention, the computing device provides information related to at least one of: pace of play for the each sub-activities, sub-activity start times, statistics, and weather to the plurality of patrons of the plurality of patron sensor devices within the activity venue. The plurality of patron sensor devices can each comprise a light-emitting diode (LED), the LED configured to change color based on an actual pace of a patron carrying the plurality of patron sensor devices relative to another patron or group of patrons carrying one or more of the plurality of patron sensor devices ahead of the patron and a target pace for the patron.

In accordance with aspects of the present invention, the plurality of patron sensor devices each include an electronic ink (e-Ink) display, the e-Ink display configured to display a distance to another one of the plurality of patron sensor devices or distance to a venue asset tag. In accordance with aspects of the present invention, the displayed distance is a distance to a pin with device venue asset tag on a current hole on a golf course. The plurality of patron sensor devices can each include a payment method stored on the plurality of patron sensor devices. In accordance with aspects of the present invention the plurality of patron sensor devices each comprise a motion sensor, and when the motion sensor for a patron sensor device does not detect motion for a predefined period of time, the patron sensor device enters a low power state, and upon a detection of motion, the patron sensor device is woken from the low power state. Each of the plurality of patron sensor devices can be at least one of a golf bag tag, a key chain, a card, a club grip, and a ball mark repair tool. In accordance with aspects of the present invention, the venue asset tag is in local communication with at least one patron sensor device of the plurality of patron sensor devices and enables calculation of a distance between the venue asset tag and the at least one patron sensor device without use of an intermediary device. In accordance with aspects of the present invention, the wireless gateway comprises a long range wide area network (LoRa) gateway.

In accordance with aspects of the present invention, the system includes one or more venue asset tags configured to communicate with the wireless gateway and provide real-time location data for the one or more venue asset tags. One or more venue asset tags can be attachable to or integrated into at least one of a flag stick, a golf cart, a piece of maintenance equipment, a maintenance vehicle, a yardage marker, sprinkler heads, and a sign. The one or more venue asset tags attached to or integrated into the sprinkler heads are configured to monitor an operating state of the sprinkler heads and turn on and off the sprinkler heads in response to receiving instructions from the computing device. The one or more venue asset tags attached to or integrated into the maintenance vehicle can be configured to detect vibration of the maintenance vehicle during operation and transmit a duration of operation to the computing device and the computing device optimizes a maintenance schedule for the maintenance vehicle based on the duration of operation. The computing device can be a cloud based computing device infrastructure. The system can identify predictive gaps in usage of each sub-activity based on the location data for each of the plurality of patron sensor devices, and the system can issue notifications of recommended points of access for sub-activities at future times having the identified predictive gaps in usage in such a way that maximizes a number of the plurality of patrons engaging in each sub-activity of the plurality of sub-activities and minimizes a number of the plurality of patrons waiting to engage in usage of each sub-activity due to the sub-activity being utilized by other of the plurality of patrons.

In accordance with an embodiment of the present invention, a system for optimizing activity of golfers carrying one or more specialized mobile sensors throughout a golf course is provided. The system includes a gateway configured to receive location data from the one or more specialized mobile sensors. The system also includes a tracking tool configured to track movements of each of the one or more specialized mobile sensors over a period of time based on the received location data. The system further includes a data management tool configured to aggregate the received location data and the tracked movements to determine instructions to optimize traffic patterns and reduce playtimes of the golfers on the golf course. The gateway is configured to transmit the instructions to the one or more specialized mobile sensors and/or an operator to implement optimized traffic patterns and reduce playtimes. In some implementations, the system the instructions provide information related to placement location and placement time of the golfers on the golf course.

In accordance with an embodiment of the present invention, a system for tracking precise patron movement on a golf course is provided. The system includes two or more virtual cages designated on each hole of the golf course, the two or more cages are defined by geolocation boundaries. The system also includes a venue gateway device configured to receive location data from the one or more specialized mobile sensors. The system further includes a data management tool configured to identify when one of the one or more specialized mobile sensors crosses into an area defined by one of the geolocation boundaries for one of the two or more cages based on the received location data. The data management tool is also configured to record a clock time of the crossing and an identifier of the one of the one or more specialized mobile sensors and determine a pace of play for a patron carrying the one of the one or more specialized mobile sensors based on the recorded clock time. The data management tool is further configured to transmit instructions to the one or more specialized mobile sensors and/or an operator based on the determined pace of play.

In accordance with aspects of the present invention, the geolocation boundaries for the two or more virtual cages are positioned around a tee off area and a green area on each hole of the golf course. The geolocation boundaries for the two or more virtual cages can be positioned around at least one fairway area on at least one hole of the golf course. The geolocation boundaries for the two or more virtual cages can be positioned at designated areas other than the tee off area, the green area, and the at least one fairway area.

In accordance with aspects of the present invention, the system further includes at least two virtual arcs designated on each hole of the golf course. In some implementations, the at least two virtual arcs designate a position of geolocation boundaries for virtual cages on a fairway of a hole on the golf course, and wherein the position is identified by points in which two of the at least two virtual arcs overlap.

In accordance with aspects of the present invention, the recorded clock time is recorded each time a patron enters and exits each of the two or more virtual cages on the golf course. The pace of play of the patron can be calculated by determining a difference of recorded clock times for each patron throughout the golf course. The pace of play of the patron can be determined in accordance with $TT(i,j)=T(i,j)-WW(i,j)$ where i is a group number, j is a hole number, n is a cage number, $TT(i,j)$ is a play time minus a wait time to play hole j by group i, $T(i,j)$ is the actual time duration group i took to play hole j, and $WW(i,j)$ is the total wait time for group i on hole j for all cages on hole j. A statistical regression analysis can be performed on recorded clock times for patrons on the golf course to calculate a patron pace rating for each of the patrons.

In accordance with aspects of the present invention, locations of patrons on the golf course are tracked through identification of recorded clock times for the crossing of geolocation boundaries of the two or more virtual cages. The locations of patrons on the golf course can be utilized by the system for real-time adjustment of the tee time based on current throughput.

In accordance with an embodiment of the present invention, a system for managing maintenance tasks within an activity venue, the activity venue including a plurality of sub-activities, is provided. The system includes a wireless gateway and a plurality of patron sensor devices. The plurality of patron sensor devices are for disposition and transportation throughout the activity venue by a plurality of patrons. Each of the plurality of patron sensor devices include a location sensor configured to provide real-time location and time data indicating the location of the plurality of patron sensor devices at different points in time within the activity venue. Each of the plurality of patron sensor devices also include a wireless communication device for communication with the wireless gateway, the communication including transmitting the real-time location and time data from the plurality of patron sensor devices to the wireless gateway, enabling the system to establish a real-time location of each of the plurality of patron sensor devices within the activity venue. The system further includes a computing device in communication with the wireless gateway. The computing device executes a tracking tool that receives the real-time location and time data for each of the plurality of patron sensor devices via the wireless gateway and transforms the real-time location and time data into predictive data indicating anticipated locations of each of the plurality of patron sensor devices within the activity venue at future times. The system identifies predictive gaps in usage of each sub-activity of the plurality of sub-activities based on the location and time data for each of the plurality of patron sensor devices.

In accordance with aspects of the present invention, the system issues notifications to one or more operator devices and/or sensors devices associated with staff members, recommending types of maintenance tasks to be performed during the predictive gaps in usage. In accordance with aspects of the present invention, the system further includes one or more venue asset tags configured to communicate with the wireless gateway and provide real-time location and time data for the one or more venue asset tags. In accordance with aspects of the present invention, the one or more venue asset tags are attachable to or integrated into at least one of a flag stick, a golf cart, a piece of maintenance equipment, a maintenance vehicle, a yardage marker, sprinkler heads, and a sign. In accordance with aspects of the present invention, the one or more venue asset tags attached to or integrated into the sprinkler heads are configured to monitor an operating state of the sprinkler heads and turn on and off the sprinkler heads in response to receiving instructions from the computing device. In accordance with aspects of the present invention, the one or more venue asset tags attached to or integrated into the maintenance vehicle are configured to detect vibration of the maintenance vehicle during operation and transmit a duration of operation to the computing device and the computing device optimizes a maintenance schedule for the maintenance vehicle based on the duration of operation.

In accordance with aspects of the present invention, the computing device provides information related to at least one of: sub-activity time management, participant matching, live traffic control, statistics related to the tracked movements of the plurality of patrons, predictive analytics of the plurality of patrons, layout of the activity venue, and maintenance of the activity venue to at least an operator of the activity venue. In accordance with aspects of the present invention, the computing device provides information related to at least one of: pace of play for the each sub-activities, sub-activity start times, statistics, and weather, to the plurality of patrons of the plurality of patron sensor devices within the activity venue. In accordance with aspects of the present invention, the plurality of patron sensor devices each comprise an electronic ink (e-Ink) display, the e-Ink display configured to display a distance to another one of the plurality of patron sensor devices or distance to a venue asset tag. In accordance with aspects of the present invention, the plurality of patron sensor devices each include a motion sensor, and when the motion sensor for a patron sensor device does not detect motion for a predefined period of time, the patron sensor device enters a low power state, and upon a detection of motion, the patron sensor device is woken from the low power state.

In accordance with aspects of the present invention, each of the plurality of patron sensor devices can be at least one of a golf bag tag, a key chain, a card, a club grip, and a ball mark repair tool. In accordance with aspects of the present invention, a venue asset tag is in local communication with at least one patron sensor device of the plurality of patron sensor devices and enables calculation of a distance between the venue asset tag and the at least one patron sensor device without use of an intermediary device. In accordance with aspects of the present invention, the wireless gateway comprises a long range wide area network (LoRa) gateway. In accordance with aspects of the present invention, the computing device is a cloud based computing device infrastructure. In accordance with aspects of the present invention, the system issues notifications of recommended points of access for sub-activities at future times having the identified predictive gaps in usage in such a way that maximizes a number of the plurality of patrons engaging in each sub-activity of the plurality of sub-activities and minimizes a number of the plurality of patrons waiting to engage in usage of each sub-activity due to the sub-activity being utilized by other of the plurality of patrons.

In accordance with an illustrative embodiment of the present invention, a method of tracking patron movement on a golf course is provided. The method including receiving location data and time data from one or more patron sensor devices and one or more operator devices, the location data and time data triggered by an indication that one of the one or more patron sensor devices has crossed into an area defined by a geolocation boundary for one of two or more cages designated on each hole of the golf course. The method also including recording a clock time of the crossing based on the time data, the location of the crossing, and an identifier of the one of the one or more patron sensor devices. The method is further including determining a pace of play for a patron carrying the one of the one or more patron sensor devices based on the location and the recorded clock time. The method also includes transmitting instructions to the one or more patron sensor devices and/or the one or more operator devices based on the determined pace of play.

In accordance with aspects of the present invention, the instructions are transmitted to the one of the one or more patron devices and are related to the patron being on pace or behind pace. In accordance with aspects of the present invention, the instructions are transmitted to one of the one or more operator devices and are related dispatching maintenance staff to a location based on pace of play for each patron associated with the one or more patron sensor devices.

BRIEF DESCRIPTION OF THE FIGURES

These and other characteristics of the present invention will be more fully understood by reference to the following detailed description in conjunction with the attached drawings, in which:

FIGS. 4A, 4B, 4C, and 4D are illustrative configurations for capturing precise player movement data on a golf course, in accordance with the aspects of the invention;

DETAILED DESCRIPTION

Figure 1:
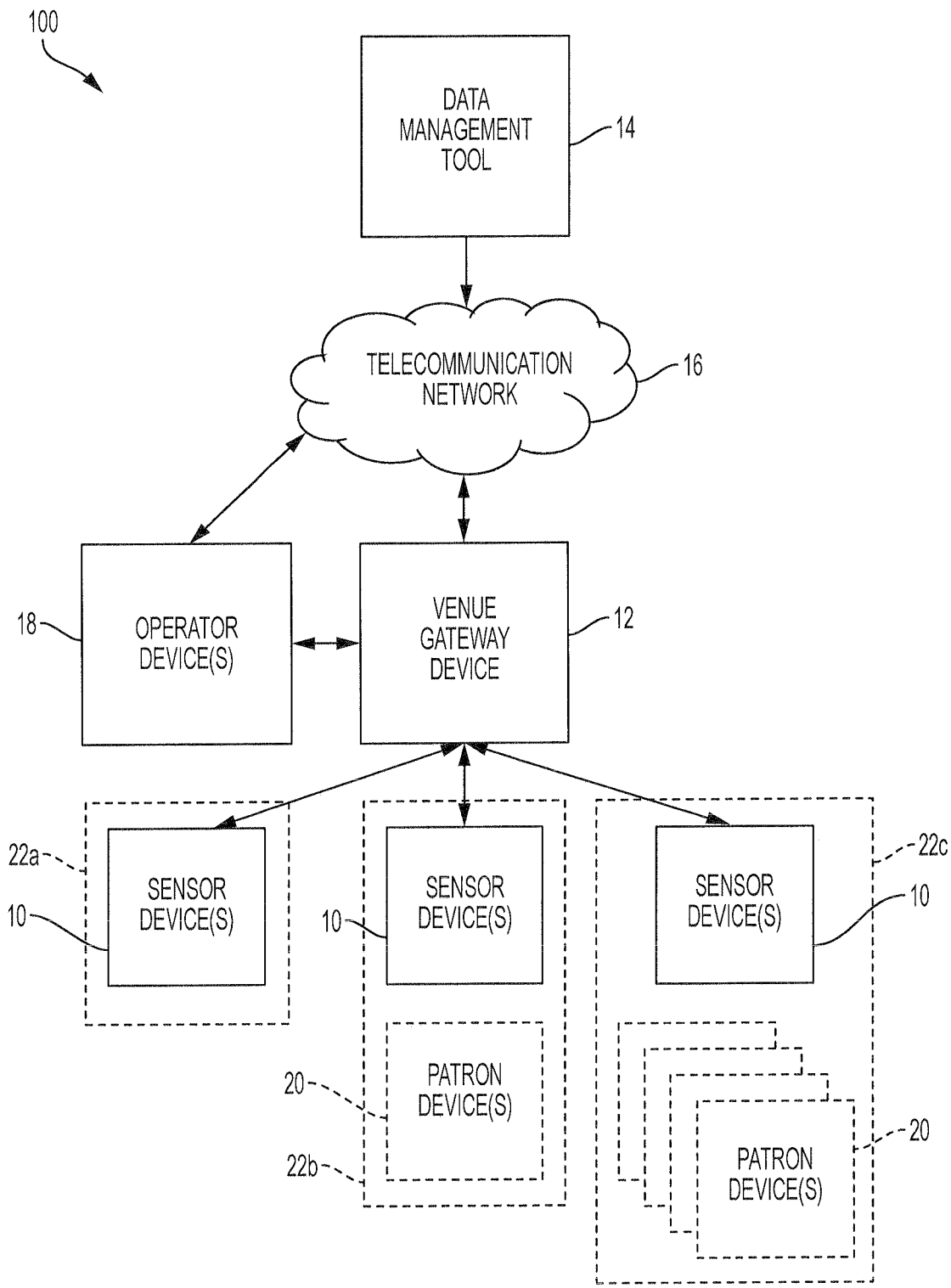
FIG. 1 is an illustrative system for implementing the steps in accordance with the aspects of the present invention.

An illustrative embodiment of the present invention relates to tracking locations and pace of play of patrons at an activity venue and providing the patrons with feedback to manage their locations for an improved pace of play and improved overall throughput of patrons at the activity venue. The present invention utilizes the locations of patrons and related objects in an activity venue to determine various metrics that can be used by patrons and operators of the venue to enhance the patron experience through a reduction in wait times and a total amount of time to complete an activity, while also optimizing the number of patrons that can be effectively handled by the activity venue and the efficiency by which staff can maintain the venue. Each patron, and other objects being tracked, is provided with a sensor device configured to report location information of that patron, or object, throughout the venue. The location information is relayed to a central venue device for analysis. In accordance with one example embodiment, the location data is transmitted to a local or cloud computing infrastructure for analysis. The local or cloud computing infrastructure can include a data management tool configured to analyze the received data with a focus on evaluating crowds and other objects throughout a particular venue.

The local or cloud computing infrastructure can utilize a live (e.g., real-time) look-in of the location data for all patrons to make determinations related to congestion and can record the location information over time to accurately estimate wait times, predict future points of congestion, or identify other issues. The live data and estimated wait times can be provided to patrons and operators at the activity venue to inform each as to what can be expected at any given time. In accordance with an example embodiment, each patron at the activity venue can also be assigned a pace of play value, using a combination of the live location data and historically received location data for that patron. Using the pace of play value for all of the patrons at a venue, the computing infrastructure can perform additional analysis of all the data and can predict a future flow of traffic to identify potential trouble spots (e.g., areas where longer lines or delays may be more likely to occur, bottlenecks, or potential upcoming venue resources that are being underutilized and are therefore being wasted). Once the computing infrastructure has performed the analysis and identified current points of congestion and any potential trouble spots, mitigating instructions can be determined and proactively sent to patrons and operators at the venue as preventative measures.

As referenced above, the mitigating instructions can include identifying gaps or underutilized areas of the activity venue and instructing operators, staff, and/or patrons to begin activities at those areas. In particular, an activity venue can have multiple points of entry to begin an activity or sub-activity, the computing infrastructure can identify the points of entry closest to the gaps or underutilized areas and direct patrons to those points of entry. For example, a typical golf course has 18 holes, which can be viewed by the computing infrastructure as 18 separate points of entry to 18 separate sub-activities, each sub-activity being one of the 18 holes. Based on the congestion of golfers (patrons) on the golf course, the computing infrastructure can recommend that golfers tee off on holes that have a gap in play between existing groups of patrons on the course. By distributing the golfers evenly throughout the 18 holes of the golf course, each golfer can play with reduced wait times and experience a reduction in overall playtime. Additionally, by optimizing the number of golfers playing on a course at any given time, the computing infrastructure is able to maximize the profitability for the activity venue by maximizing throughput. As would be appreciated by one skilled in the art, an activity venue can include a number of activities and sub-activities, and each activity can also include sub-activities. For example, a venue can include a miniature golf course, and arcade, and concessions (activities or sub-activities), with the miniature golf course including a number of holes (sub-activities of activities or sub-activities).

Additionally, the identification of gaps or underutilized areas of the activity venue can further be utilized for venue maintenance. In particular, the computing infrastructure can provide administrators and maintenance staff of the activity venue with optimal locations and durations of time for periodic maintenance of sub-activities within the venue. For example, on a golf course gaps and the duration of the gaps between golfers can be identified and tagged for particular types of maintenance (e.g., watering, grass cutting, repairs, etc.). The computing infrastructure can also recommend specific works and/or types of maintenance to be performed within the identified gaps based on data aggregated from throughout the venue.

Maintenance superintendents (e.g., operators) also benefit from information on how long their staff spends performing specific tasks, at specific locations, and with what specific maintenance equipment. The computing infrastructure and sensor device(s) associated with both staff and equipment report on staff location, equipment location, effectiveness, and ultimately serve as a dispatch system combined with a mobile phone application used to present information to both supervisors and staff. The computing infrastructure provides a dispatch system that utilizes the patron data to recommend maintenance schedules and activities that efficiently work around and in between patrons.

In addition to providing live traffic control, traffic prediction, maintenance instructions, and other proactive instructions, the computing infrastructure can also provide unique venue scheduling, flexible usage experiences, and revenue modeling platforms. The combination of tracking the location of patrons and identifying points of entry to avoid congestion, the computing infrastructure can enable a patron to pay per completed activity or sub-activity or pay for a period of time. For example, if the patron only has a limited amount of time to partake in an activity, the patron can elect to pay per activity or sub-activity (e.g., pay for four holes of golf) or pay for a period of time (e.g., pay for ninety minutes of golf). As a result of patrons carrying the sensor devices, the system of the present invention can track the patron and identify how many activities the patron has participated in, or how long the patron has been active at the venue, and charge accordingly. As would be appreciated by one skilled in the art, the functionality of tracking live and historical location data for patrons at an activity venue can be applied to any number of metrics to optimize gameplay speed, reduce wait times, maximize scheduling, maximizing revenue, and enhance the overall patron entertainment experience.

FIGS. 1 through 8, wherein like parts are designated by like reference numerals throughout, illustrate an example embodiment or embodiments of the patron management system, according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed in a manner still in keeping with the spirit and scope of the present invention.

FIG. 1 depicts an illustrative environment for implementing aspects of the present invention. In particular, FIG. 1 depicts a computing system 100 for use in conjunction with an activity venue to obtain data related to patrons and staff within the activity venue. The system 100 is configured to utilize the obtained data to manage the patrons, the staff, and the activities or sub-activities throughout the activity venue. In particular, the system 100 can obtain and aggregate data related to location and times (e.g., via timestamp, clock time, etc.) associated with locations for each patron, staff member, and operator within a venue. In accordance with an example embodiment of the present invention, the system 100 includes a venue gateway 12, a data management tool 14, and a telecommunication network 16. Additionally, the system 100 includes one or more specialized mobile sensors. The one or more specialized mobile sensors include a plurality of sensor device(s) 10, operator device(s) 18, and patron device(s) 20, for example, such as a mobile device or other computing device as later described herein.

In accordance with an example embodiment of the present invention, the sensor device(s) 10 can be specialized devices with specialized functions providing location information of patrons, staff, and/or objects and providing information back to patrons or staff carrying the sensor device(s) 10 in a non-intrusive manner. The sensor device(s) 10 can include, as discussed in greater detail in FIG. 2A, a microcontroller (MCU) 202, a transceiver 204 with antenna, a global positioning system (GPS) locator 206, a battery power source 208, a light emitting diode (LED) 210, and a display, such as a low power display (e.g., an electronic ink (e-Ink) display). The device sensor(s) 10 are configured to gather location data for the device and transmit the location data to a venue gateway device 12. As would be appreciated by one skilled in the art, the device sensor(s) 10 can also transmit additional data along with the location data. For example, the device sensor(s) 10 can also include timestamp and identifier data associated with the device sensor(s) 10 to be transmitted to the venue gateway device 12.

In accordance with an example embodiment of the present invention, the location and time data is transmitted from each of the sensor device(s) 10 to the venue gateway device 12 over a wireless network, such as for example, a long range wide area network (LoRa). In particular, the location and time data is transmitted over a narrow band radio frequency (RF) telecommunication network 16 (such as, for example, LoRa). As would be appreciated by one skilled in the art, the location and time data can be transmitted over any suitable communication platform known in the art (e.g., cellular network, narrow band radio frequency, Wi-Fi, LoRa, etc.). The venue gateway device 12 can be a computing device similarly structured to the sensor device(s) 10, it can be a general purpose computer specifically configured, or it can be a specialized computer system operable to communicate with the sensor device(s) 10. For example, as would be appreciated by those of skill in the art, the venue gateway device 12 can include a single computing device, a collection of computing devices in a network computing system, a cloud computing infrastructure, or a combination thereof. In accordance with an example embodiment of the present invention, the venue gateway device 12 is a centralized LoRa device operable to communicate with and aggregate data from each of the sensor device(s) 10 throughout the activity venue.

The venue gateway device 12 can also be configured to communicate with a cloud based data management tool 14. In particular, the venue gateway device 12 can communicate the location and time data received from the sensor device(s) 10 to the data management tool 14 for additional processing. For example, the computing devices (venue gateway device 12, cloud based data management tool 14) can be configured to establish a connection and communicate over a telecommunication network 16. As would be appreciated by one of skill in the art, the telecommunication network 16 can include any combination of known networks. For example, the telecommunication network 16 can be combination of a mobile network, WAN, LAN, or other type of network. The telecommunication network 16 can be used to exchange data between the venue gateway device 12 and the data management tool 14.

In accordance with an example embodiment of the present invention, the data management tool 14 can be a cloud computing and storage environment configured to collect, aggregate, analyze, and provide metrics using location and time data received from various activity venues. The data management tool 14 can also include a database management system utilizing a given database model configured to interact with a user for analyzing the database data. Additionally, the data management tool 14 can analyze the collected location data, time data, and other information to distribute instructions and/or feedback information to the venue gateway device 12 and/or the sensor device(s) 10 (e.g., operator device(s) 18 and/or patron device(s) 20).

In accordance with an example embodiment of the present invention, the computing and database storage environment of the data management tool 14 performs analytics through a web application and delivers the results of the analytics through the web to user devices. For example, the delivered data can inform users of venue usage, pace of play of the patrons, live traffic control, predicted potential traffic issues, identified bottlenecks, visibility of the entire activity venue and all patrons, staff and security within the physical space of the activity venue, maintenance request, outstanding maintenance, ideal locations/items for maintenance, security or other analytics. As would be appreciated by one skilled in the art, live traffic control can be a representation of a flow of traffic of individuals or subgroups of individuals throughout the activity venue. The individuals can be any combination of patrons, operators, and staff members at the activity venue.

In accordance with an example embodiment, the analyzed data can also be used to implement different revenue models. The analyzed data can be used to implement revenue models based on duration, on completing a number of sub-activities at the activity venue, or supply and demand. For example, patrons on a golf course can pay per hole or pay per an amount of time on the golf course, regardless of the number of holes completed (e.g., ninety minutes). Similarly, the data management tool 14 can adjust prices based on a number, or projected number, of patrons at the venue. For example, during slow periods, the prices can be reduced to attract patrons.

In accordance with an example embodiment, the operator device(s) 18 and/or patron device(s) 20 can be secondary computing devices used to supplement the other components of the system 100. For example, the operator device(s) 18 and/or patron device(s) 20 can be mobile computing devices (e.g., smartphone, tablet, laptop, smart watch, etc.) or generic computing devices (e.g., desktop) used by patrons and operators, respectively, to access the system 100 and the data stored thereon. As would be appreciated by one skilled in the art, the operator device(s) 18 and/or patron device(s) 20 can communicate with the data management tool 14 and/or the venue gateway device 12 over the telecommunication network 16 to access information provided by the system 100 through the use mobile/software applications, accessing through a webpage, or a combination thereof. In accordance with an example embodiment of the present invention, the venue gateway device 12 and one of the operator device(s) 18 is the same device. As would be appreciated by one skilled in the art, the operator device(s) 18 and/or patron device(s) 20 are not necessary for the overall operations of the system 100, but are potentially useful to supplement the user experience (e.g., patrons or operators) of the overall system 100.

In particular, the operator device(s) 18 and/or patron device(s) 20 can include software (e.g., mobile apps, software applications, etc.) configured to receive and display data received from the data management tool 14. In accordance with an example embodiment of the present invention, each of the operator device(s) 18 and/or patron device(s) 20 receive information tailored to the types of users using the respective devices. In particular, the operator device(s) 18 receive information relating to operations of that particular activity venue (e.g., maintenance) and the patron device(s) 20 are operable to receive information relating patrons of the activity venue and patron experience (e.g., location within the venue, time, pace of play, etc.). For example, the operator device(s) 18 can receive data related to booking appointments for the patrons, live traffic control, pace of play of patrons at the activity venue, patron notifications, activity venue and sub-activities usage data, information related to maintenance, maintenance requests, time(s) and location(s) to perform maintenance, and operational statistics of the activity venue. Similarly, the patron device(s) 20 can receive data related to appointment booking, digital check-in and start times, unique revenue model pricing, pace of play predictor (e.g., projected start/finish time), live venue traffic map, and ratings for the activity venue, among other information. As would be appreciated by one skilled in the art, the information provided to the operator device(s) 18 and patron device(s) 20 can be accessed through a specific application designed for the particular operator device 18 or patron device 20 or the operator device 18 and patron device 20 can use existing applications to access the information (e.g., access a webpage through a web browser on the patron device 20).

In accordance with an example embodiment of the present invention, the sensor device(s) 10 can be associated with one or more of the patron device(s) 20. The data management tool 14 can be configured to determine that one or more patron device(s) 20 have been linked with a particular sensor device 10. For example, a patron can use their patron device 20 to enter identifier(s) of the sensor device(s) 10 that are currently being used by the patron, the patron device 20 can be paired with a particular sensor device 10 (e.g., Bluetooth), or the patron can purchase a sensor device 10 for repeated use and register their device. When a sensor device 10 has been identified and/or registered by the patron, the data management tool 14 can link the sensor device 10 with the patron device 20, and thus a patron user, within the system 100. As would be appreciated by one skilled in the art, the patron device(s) 20 and sensor device(s) 10 can be automatically or manually unlinked upon a determination that the patron is no longer using the sensor device(s) 10 (e.g., the patron has left the activity venue). When sensor device(s) 10 have been linked with one or more patron device(s) 20, data can be transmitted to all linked devices 10, 20 by the data management tool 14 (e.g., directly or via the venue gateway device 12) and/or the devices 10, 20 can share data between one another. For example, if the sensor device 10 has received an indication of a slow pace of play, via the venue gateway device 12, the patron device(s) 20 can similarly receive the same indication directly from the data management tool 14. Alternatively, only the sensor device 10 receives the indication from the data management tool 14 and subsequently relays the indication to patron device(s) 20.

Continuing with FIG. 1, the system 100 includes various combinations of the sensor device(s) 10 being unlinked or linked with patron device(s) 20, as reflected in combinations 22a, 22b, 22c. In accordance with an example embodiment of the present invention, the sensor device(s) 10 cannot be linked to any patron device(s) 20 as depicted by 22a. The unlinked sensor device(s) 10 can be venue asset devices 22a or venue asset tags unassociated with any patron device(s) 20. For example, the sensor device 10, as depicted by 22a, has not been registered with the data management tool 14 by a patron but with an object and the sensor device 10 is attached to the object associated with the activity venue (e.g., a golf flag). Alternatively, the sensor device(s) 10 can be linked to a single patron device 20, as depicted by 22b. For example, a single patron has identified/registered the sensor device(s) 10 with the data management tool 14 (e.g., a patron registered a bag tag sensor device 10 attached to their golf bag). Additionally, the sensor device(s) 10 can further be linked to a plurality of patron device(s) 20, as depicted by 22c. For example, a party of patrons registers their respective patron device(s) 20 with the same sensor device(s) 10 and relays the combination to the data management tool 14 (e.g., a group of four golfers sharing a golf cart with a key chain sensor device 10).

In accordance with an example embodiment of the present invention, staff and operators within the venue can be associated with sensor device(s) 10 and/or associated with operator device(s) 18. Similarly to tracking locations and times associated with the locations for patrons, the data management tool 14 can track the location and time spent at locations for staff and operators associated with the sensor device(s) 10 and/or operator device(s) 18. Additionally, the data management tool 14 can track which staff members and operators associated with the sensor device(s) 10 and/or operator device(s) 18 are currently assigned to perform a task (e.g., maintenance), performing a task, waiting to be assigned a task, etc. Accordingly, the data management tool 14 utilizes the sensor device(s), patron device(s) 20, operator device(s) 18 to aggregate all the location and time related data for both patrons and staff/operators throughout the venue. The data management tool 14 can utilize the aggregated data to perform further analytics and execute instructions in response to those analytics, as discussed in greater detail herein. For example, the data management tool 14 can determine locations for all patrons within a venue, identify gaps between patrons, and assign patrons to those gaps or assign staff members to perform requested maintenance within the identified gaps.

Figure 2A:
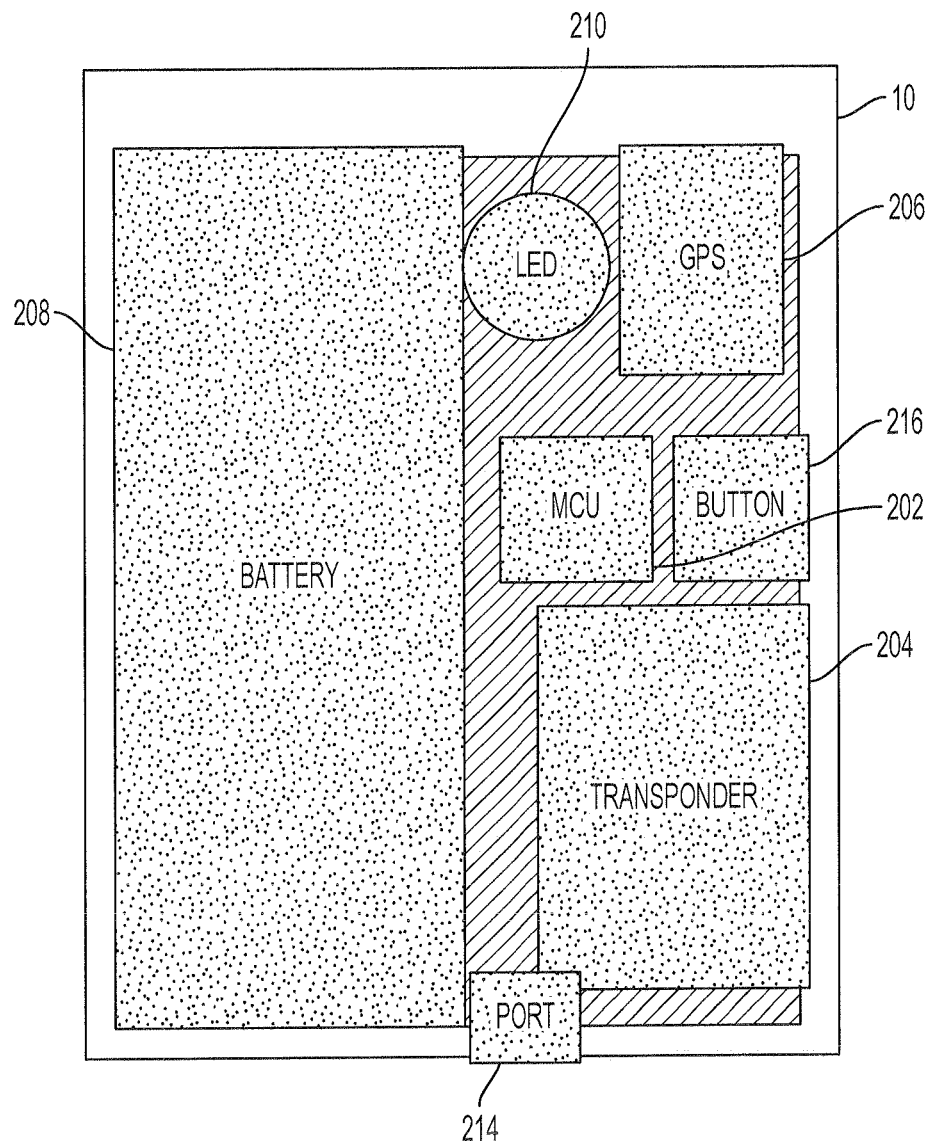
FIGS. 2A and 2B are illustrative architectures of the sensor device(s), in accordance with the aspects of the invention.
Figure 2B:
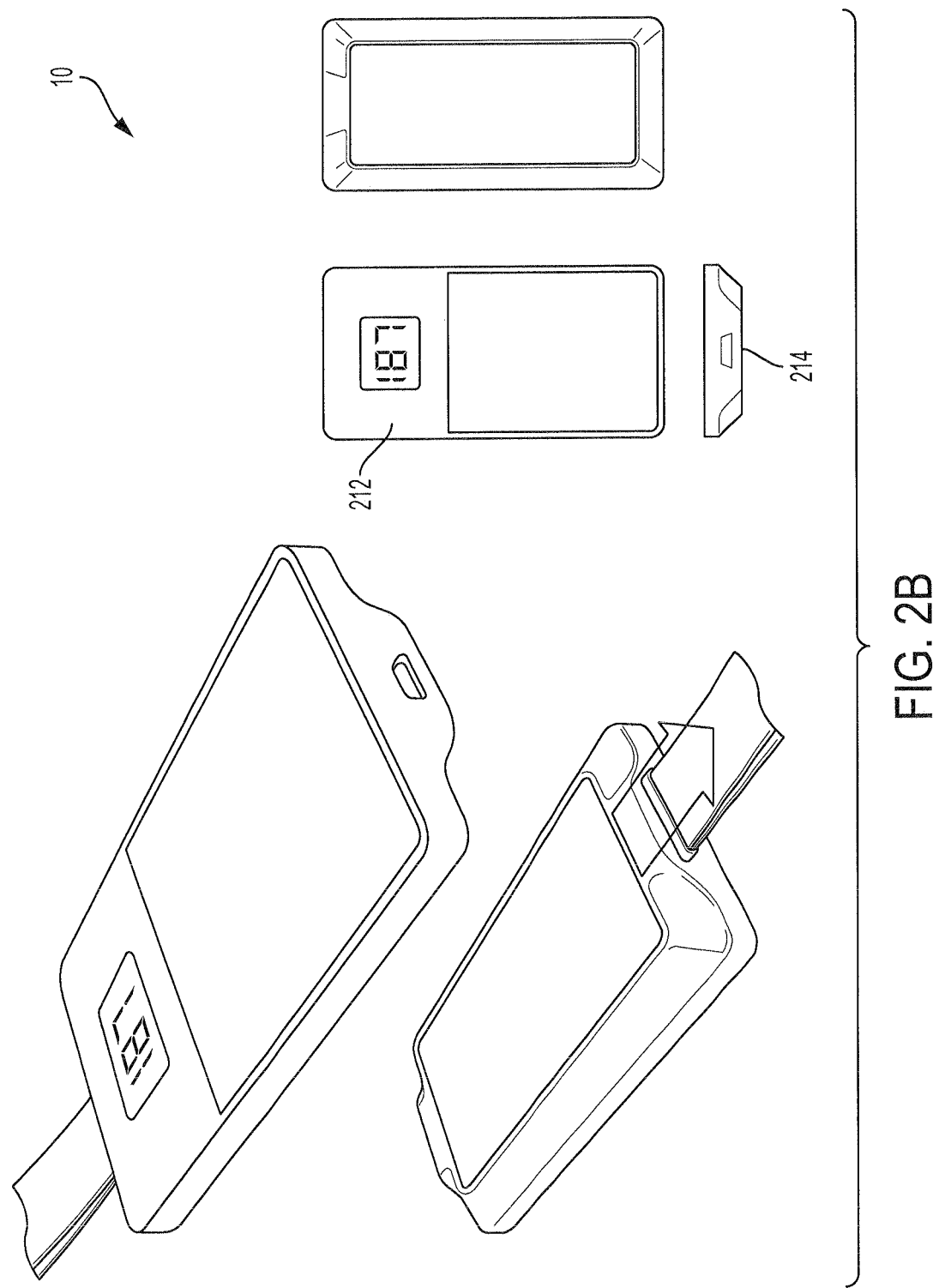

FIGS. 2A and 2B depict example architectures of the sensor device 10, as discussed with respect to FIG. 1. As discussed herein, the sensor device 10 can include a combination of known components including a microcontroller (MCU) 202, a transceiver 204, a global positioning system (GPS) locator 206, a battery power source 208, an LED 210, and an electronic ink (e-Ink) display 212. As would be appreciated by one skilled in the art, the components of the sensor device 10 can be substituted with components configured to perform the same functionality as the components included in FIGS. 2A and 2B and can also include additional components to add customized and/or improved functionality for a given activity venue. For example, the sensor device 10 can include a charging port 214 to recharge the battery power source 208, a motion detection module to detect motion, a payment component (e.g., a smart chip), or other additional components. Similarly, the sensor device 10 can omit components to add customization and/or improved functionality for a given activity venue. For example, the sensor device 10 integrated within golf flags may not require a display device because the sensor device(s) 10 for golf flags are primarily designed to give a reference location of a flag. Accordingly, the sensor device 10 for flags can be designed to without a display to reduce cost and power usage.

In accordance with an example embodiment of the present invention, the MCU 202 is configured to perform any computations and data collection that are required by the sensor device 10. The transceiver 204 is configured to perform wireless transmission and reception of data with one or more other devices. For example, the transceiver 204 can be long range wide area network device (LoRa) to transmit data to the venue gateway device 12. As would be appreciated by one skilled in the art, the transceiver 204 can be operable to communicate over any combination of communication mediums including but not limited to Wi-Fi, cellular, radio frequency technologies, etc. In accordance with an example embodiment of the present invention, the sensor device(s) 10 is configured to receive information from the venue gateway device 12, the data management tool 14, operator device(s) 18, patron device(s) 20, and from other sensor device(s) 10 through the transceiver 204. The GPS locator 206 is configured to determine and exchange location data of the sensor device 10 with the MCU 202 for transmission by the transceiver 204 to venue gateway device 12. For example, location data obtained by the GPS locator 206 can be transmitted, via the transceiver 204, periodically, (e.g., every 20 seconds) to the venue gateway device 12.

Continuing with FIGS. 2A and 2B, the battery power source 208 provides power to the sensor device 10. For example, the battery power source 208 can be one or more Li-ion batteries. In accordance with an example embodiment of the present invention, the battery power source 208 is also configured to conserve power usage. For example, the battery power source 208 can be configured to supply power upon detection of motion of the sensor device 10 (e.g., via a motion detection device) and return to standby mode when the sensor device 10 is not in use (e.g., no motion is detected). As would be appreciated by one skilled in the art, the motion detection device can include an accelerometer, gyroscope, or other type of motion detection device known in the art. In accordance with an example embodiment of the present invention, motion can also be detected by identifying a change in location of the sensor device 10. For example, using the GPS locator 206, a determination that the sensor device 10 has moved to a new location. The change in location determination can be used in place of a motion detection device within the sensor device 10, or in conjunction with a motion detection device as a redundancy or for verification.

In accordance with an example embodiment, the sensor device(s) 10 are also operable to receive and convey information and notifications to the patrons throughout the activity venue. In particular, the information or notifications can be conveyed to the patron carrying the sensor device 10 through a variety of visual cues. As would be appreciated by one skilled in the art, the information or notifications can be displayed to the patrons on a display, such as a low energy display, including an e-Ink type display 212, or can be conveyed to the patrons through a color display/change of the LED 210 on the sensor device 10. For example, the e-Ink type display 212 can display a distance to another sensor device 10 (e.g., a flag stick at a hole on a golf course). Similarly, the LED 210 can change the displayed color to reflect how the patron is doing on their pace relative to other patrons, as determined by the data management tool 14 (e.g., green can reflect that the patron is ahead of the pace, yellow can reflect that the patron is on pace, or red can reflect that the patron is behind the pace). For example, if the data management tool 14 determines that the patron is moving at a pace slower than the pace established by patrons in front of and/or behind the patron, the LED will indicate the appropriate color for a slow pace. In accordance with an example embodiment, the LED color can reflect a patron's pace by comparing their progress in a given activity or sub-activity against a benchmark. For example, on a golf course, each hole has a par time (e.g., 15 minutes to complete a par 3 hole) and if a patron takes longer than a certain amount of time over the par time the light will change to reflect that they are over the par time (e.g., by turning the LED color to yellow or red).

In accordance with an example embodiment, the e-Ink type display 212 is configured to carry out the same functions as discussed related to the LED 210. As would be appreciated by one skilled in the art, in the absence of an LED 210, the functions of the LED 210 can be executed and/or displayed by the e-Ink type display 212. For example, if a patron is behind a predicted pace of play and has a sensor device 10 that is only equipped with an e-Ink type display 212, then the e-Ink type display 212 can display the color red (or text) to indicate to the patron that they are behind the pace. Additionally, the e-Ink type display 212 or LED can be used to provide visual cues to staff working at the activity venue, For example, if there is a gap on at a certain location within the venue, a visual cue can be provide to the staff to be dispatched with certain equipment by sending a message to the e-Ink type display 212 and/or to a staff mobile application (e.g., on the operation device(s) 18).

In accordance with an example embodiment of the present invention, the sensor device(s) 10 also includes a button 216 to be used by a patron to initiate various functions on the sensor device(s) 10. For example, the button 216 can be an electromechanical button, or a touch sensitive button, that when pressed causes the sensor device(s) 10 display information to the patron. In accordance with an example embodiment of the present invention, pushing the button 216 causes the sensor device(s) 10 to initiate a call to the venue gateway device 12, requesting information and requested information is subsequently received from the venue gateway device 12 for display on the sensor device(s) 10 (e.g., via the LED 210, e-Ink type display 212, or combination thereof). For example, a golfer (e.g., patron) pushes the button 216 on a sensor device 10 during a round of golf to request a distance to a pin at the current hole. The venue gateway device 12 device can use the location information obtained from the golfer's sensor device 10 and the sensor device 10 attached to the pin at the golfer's current hole to determine the distance from the patron to the pin and return the value to the golfers sensor device 10 for display. As would be appreciated by one skilled in the art, the button 216 can be used to initiate other functionality. For example, pressing the button can allow a patron to toggle through views on the display device (e.g., menus, options, information, hole information, etc.), view a current pace for the patron, view current charges applied to the patron's time at the activity venue, etc.

Continuing with FIGS. 2A and 2B, in accordance with an example embodiment, the components of the sensor device 10 are all included in a compact non-intrusive sized device (e.g., about 80 mm×48 mm×18 mm in size). The sensor devices 10 are designed as a purpose specific hardware device having a non-intrusive size as to not to detract from the user experience during an activity or sub-activity at an activity venue. For example, the sensor device 10 can be created in the form of a golf bag tag, key chain, a card, club grips, ball mark repair tools, ski tags or tickets, and an attachable device to a flag stick. As would be appreciated by one skilled in the art, the sensor device 10 can be customizable for the particular activity venue in which they are being applied. For example, a golf course may have key chain sensor device 10 for each of the golf carts, golf bag tags sensor device 10 for each patron's golf bag, and an attachable device to a flag stick sensor device 10 attached to the flag at each hole on the course. Accordingly, the system 100 can utilize location data from all of the key chains, bag tags, and flags to provide analysis and provide the appropriate feedback to operators, staff, and patrons. The use of multiple compact sensor devices 10 can provide operators, staff, and patrons with a full view of all the activities and sub-activities occurring at the activity venue at a particular point in time.

In operation, patrons, operators, and staff at an activity venue are provided with sensor device(s) 10 and the sensor device(s) 10 provide location data, time data, and other information (e.g., tracking location, timestamps, identifiers, etc.) related to the patrons and/or staff to a venue gateway device 12. The venue gateway device 12 transmits all collected location data, time data, and other collected tracking data or information to the data management tool 14. The data management tool 14 is operable to aggregate and analyze the data and provide feedback to the patrons, staff, and/or operators at the activity venue, as discussed with respect to FIGS. 1 and 2A-2B. As would be appreciated by one skilled in the art, the received data management tool 14 can collect data from multiple activity venue gateway devices at multiple different activity venues to be used during the analytics. For example, the data management tool 14 can collect data from multiple golf courses and use the data from each of the golf courses in order to deter mine certain metrics during the analysis. Based on the metrics determined during the analysis, the data management tool 14 can provide feedback to the sensor device(s) 10, the gateway venue device(s) 12, the operator device(s) 18, and/or patron device(s) 20. The feedback provides the patrons, staff, and operators with the information necessary to reduce waits during activities, optimally maintain the venue itself, and maximize profitability for the activity venue. As would be appreciated by one skilled in the art, the analysis performed on the collected data can be modified and utilized by a variety of metrics tailored to different activity venues (e.g., golf parks, skiing, amusement parks, etc.).

As discussed with respect to FIGS. 1 and 2A-2B, the data management tool 14 utilizes the collected location and time data from the sensor device(s) 10 (and optionally operator device(s) 18) throughout an activity venue to analyze usage of the venue and provide feedback based on the venue usage to operators, staff, and/or patrons. As would be appreciated by one skilled in the art, the data management tool 14 provides feedback to the patrons and staff (via the sensor device(s) 10, patron device(s) 20, and/or operator device(s) 18). The feedback related to venue usage can include providing staff/operators and patrons with instructions to proactively avoid potential congestion, relieve congestion at the activity venue, and/or providing identification of gaps for use by the operators (e.g., assign patrons to relieve congestion, dispatch staff to perform maintenance, etc.). The instructions are data driven actionable recommendations responsive to analytics on the venue usage performed by the data management tool 14. The analytics on usage include identifying gaps in time between patrons and further identifying points of entry into the activity venue approximate to those gaps.

In accordance with an example embodiment of the present invention, if the data management tool 14 determines that there is a high volume of patrons at a particular location within the activity venue, then the data management tool 14 instructs the operators to place incoming patrons to a point of entry at another location within the activity venue. For example, if there is a high volume of golfers (e.g., patrons) at the first couple holes of an 18 hole golf course, the data management tool 14 instructs the operator at the golf course to assign incoming golfers start their game at hole 9 instead of hole 1, so as to not interfere with golfers already on the course.

In accordance with an example embodiment of the present invention, the data management tool 14 is configured to provide traffic optimization of patrons throughout an activity venue. The data management tool 14 utilizes collected location and time data from the patrons throughout an activity venue to perform analytics related to predicting gaps in usage, identifying bottlenecks, recognizing issues in usage, and estimating wait times. As would be appreciated by one skilled in the art, the prediction and identification includes predicting gaps, delays, and/or bottlenecks for a particular time of day, day of the week, time of year, etc. In addition to the analytics, the data management tool 14 generates metrics to resolve the issues identified by the analytics. For example, the data management tool 14 can identify areas of congestions and/or causes of congestions and take steps to mitigate the congestions and/or causes of congestion. The main functionality provided by the data management tool 14 is directed to maximizing usage of the activity venue and minimizing wait times while maximizing revenue.

Similarly, the data management tool 14 can provide operators, staff, and patrons with feedback displaying live data without the user having to make in person observations of an entire activity venue space (e.g., walking/driving around an entire space). The live traffic can be used to estimate wait times and/or a pace to complete the current activity or sub-activity for a patron or group of patrons. The live traffic and estimated times can assist the operators and patrons to identify potential points of congestion, while also assisting to identify areas with low congestion for use to relieve congestion or schedule maintenance tasks to be performed. Overall, the live traffic and time estimates can give patrons and operators visibility into current venue usage/traffic.

In accordance with an example embodiment of the present invention, the data management tool 14 is configured to provide identification of gaps at particular locations and times by analyzing the traffic patterns of the patrons within the venue. The data management tool 14 can identify particular gaps that are ideal for performing venue maintenance. In particular, the data management tool 14 utilizes collected location and time data from patrons and staff throughout an activity venue to perform analytics related to predicting gaps in the venue usage and instead of assigning patrons to the gaps to relieve congestion, the data management tool 14 provides instructions to dispatch maintenance staff to perform a particular type of maintenance at a location during the gap or an upcoming predicted gap. The types of maintenance to be performed can include performing repairs, executing architectural changes to the venue, routine maintenance, cleaning, etc.

Additionally, based on a predicted duration of the gap (e.g., based on predicted patron pace of play), the data management tool 14 can assign a particular maintenance task, and corresponding equipment, based on a duration of time it typically takes to perform the particular maintenance task. In particular, the data management tool 14 can predict when a gap will be available at a particular location within the venue, how long the gap will be available, and assign a maintenance member/team to perform a particular task within that gap while indicating how much time they have to perform the maintenance. Similarly, the data management tool 14 can dispatch maintenance equipment to be used by the maintenance member for the particular task. The data management tool 14 can also track the amount of time dispatched staff members and specific equipment (e.g., golf carts, lawn mowers, etc.) spend at a location and/or within the gaps. Based on how much time has passed and predicted pace of play metrics, the data management tool 14 can alert the staff member as to how much time they have left before patrons are in that area. As would be appreciated by one skilled in the art, the staff members can provide updates to the data management tool 14 for a status of the maintenance task and/or that the maintenance task has been completed. Using the update information from the staff, the data management tool 14 can update information accordingly (e.g., remove the task from a list of tasks to be performed, dispatch the staff to a new location, notify the staff that time is limited to complete the task, etc.).

In accordance with an example embodiment of the present invention, the data management tool 14 can track maintenance being performed within the venue. In particular, the data management tool 14 is configured to track maintenance tasks as well as assign/dispatch maintenance tasks to be completed based on analytics of staff and patrons throughout the venue. The tracking of maintenance tasks can include managing a list of maintenance tasks to be performed, receiving requested maintenance tasks from users (e.g., operators, staff, or patrons), tracking maintenance tasks being performed, scheduling maintenance, receiving updates from maintenance staff, tracking locations of maintenance equipment, etc. Additionally, the tracking can include tracking staff members performing the maintenance tasks, scheduled to perform the maintenance task(s), or idle staff members unassigned to any tasks.

In accordance with an example embodiment of the present invention, tracking staff members performing maintenance tasks (and related equipment) is related to tracking how long it takes the staff member(s) to perform a particular task and determining the efficiency of the staff member(s) based on aggregated data. For example, the data management tool can compare an amount of time it takes a staff member to complete a particular maintenance task and compares it against aggregated data and averages of time that all staff members took to perform the particular task across the venue or a plurality of venues. In particular, the data management tool 14 establishes benchmarks for an amount of time particular tasks take staff members to complete by tracking an amount of time spent in particular areas that were assigned/dispatched for maintenance. The benchmarks are utilized by the data management tool 14 to determine the efficiency of one staff member compared to one or more other staff members. For example, the data management tool 14 can track an amount of time a staff member spends located at a bunker of a hole on a golf course when the staff member is dispatched to rack the bunker. The tracked time can be utilized thereafter with the aggregated bunker raking times from other staff members or compared to the aggregated raking times to rate the staff member's efficiency.

In accordance with an example embodiment, the data management tool 14 is configured to maintain historical tracked activity (e.g., location and time data), in addition to the data, for each of the patrons. In particular, the data management tool 14 can utilize a tracking tool to monitor the locations of via the sensor device(s) 10, patron device(s) 20, and/or operator device(s) 18 throughout the activity venue. The tracking tool receives, monitors, and stores the locations for each of the devices throughout the venue and associates the location and timestamps with the identifiers associated with each respective device(s). The historical data is used in conjunction with the live data to create metrics for an improved analysis. For example, the historical data can be used to more accurately determine estimated wait times, identify gaps or predicted gaps, typical pace of patrons, a typical duration to perform a particular form of maintenance, and provide patrons with an expected completion time of the activity or sub-activity at the venue.

In accordance with an example embodiment, the historical data collected for each sensor device 10 and/or operator device 18 can be utilized by the data management tool 14 to determine and assign a pace of play to each patron, and thereafter, perform other analytics and metrics (e.g., for maintenance). The pace of play, as determined by the data management tool 14, is a relative pace of a patron as it relates to a pace of groups ahead/behind of the patron over a period of time. Based on the determined pace of play for each of the patrons, the data management tool 14 can forecast future paces, wait times, identify gaps, and bottleneck issues before they occur. In accordance with an example embodiment of the present invention, patrons can also access to personal pace data (e.g., on their patron device(s) 20). As would be appreciated by one skilled in the art, the patron device(s) 20 can also be used to store and access additional historic data recorded during their time at an activity venue. For example, the patron device(s) 20 can be used to display scheduling, historic performance statistics for the patron, up to date time estimates and other information.

In accordance with an example embodiment, the determined pace of play is conveyed by the data management tool 14 to the operators, staff, and/or patrons to proactively mitigate the predicted wait times, potential bottleneck issues, and other issues. Similarly, the determined pace of play and locations of the patrons throughout the venue also enables the data management tool 14 to perform other analytics for use throughout the venue. For example, the data management tool 14 can utilize the pace of play and locations of patrons to identify locations of gaps throughout the venue and calculate a duration of time those gaps will remain until a patron occupies that location. The identified gaps can further be utilized by the data management tool 14 to perform other tasks, including but not limited to assigning patrons to those gaps, assigning staff members to perform maintenance tasks during those gaps, etc.

As discussed with respect to FIGS. 1 and 2A-2B, the pace of play for a patron can be conveyed to the patron through the use of the LED 210 on their sensor device 10 (e.g., red means that the patron is behind the relative pace of the patrons ahead). The indication that a patron is behind pace can motivate the patron to pick up their pace and get on pace relative to patrons in front and behind them. When a patron picks up their pace, then the overall flow of activity throughout the activity venue is increased. In accordance with an example embodiment of the present invention, the patrons are presented with incentives to keep their pace on pace or ahead of pace relative to the patrons ahead. For example, if a patron regularly maintains a good pace they are given discounts or earn reward points for use with the activity venue.

In accordance with an example embodiment of the present invention, the data management tool 14 conveys a derived relative pace of play to the patrons throughout the activity venue. The relative pace of play is determined by measuring the pace of play for a particular patron with respect to the pace of play of other patrons ahead of the patron plus an amount of time expected to complete a particular activity or sub-activity. Utilizing both the pace of play of a particular patron in relation to other patrons ahead and/or behind the particular patron and an overall expected time to complete an activity or sub-activity enables the data management tool 14 to accurately gauge how each patron is progressing in relation to outside factors. For example, the data management tool 14 can utilize the relative pace of play to determine whether a patron is behind a pace because of a slow level of personal progress or if the patron is being held up by other patron(s) ahead of them, causing the patron to wait, thus slowing the patron's pace of play. As would be appreciated by one skilled in the art, the relative pace of play can also be used to enhance how the pace of play is conveyed to the patron (e.g., through the LED 210 or e-Ink type display 212). For example, if the data management tool 14 determines that a slow pace of play for a patron is a result of having to wait for other patron(s) ahead of the patron, then the data management tool 14 will not send a behind pace of play indication (e.g., through display of the color red on the LED 210 and/or e-Ink type display 212) to the patron. Accordingly, only patrons that are behind a pace of play and free from delays caused by other patrons will be provided with a behind pace of play indication.

In accordance with an example embodiment, the relative pace of play can be used as part of s scoring system to evaluate a patron's success level of usage at the activity venue. For example, the scoring system can include a plus or minus evaluation reflecting the patron's success completing an activity or sub-activities. If the data management tool 14 determines that the patron is on or ahead of the relative pace on a particular sub-activity, then the patron's plus or minus success level is incremented by one. In contrast, if the data management tool 14 determines that the patron is behind the relative pace on a particular sub-activity, then the patron's plus or minus success level is decremented by one. As would be appreciated by one skilled in the art, the patron will not be given a negative value when their reduced pace is caused by a factor outside of their control (e.g., slow pace of other patrons ahead of the patron). This determination can be made by the data management tool 14 using the relative pace of play for the patrons. Once the patron has completed a group of particular sub-activities, the plus/minus score is tallied. Based on the final plus/minus score, the patron can see if they have an overall positive score, negative score, or even score that reflects the level of success completing the activity in an expected period of time.

Additionally, based in part on pace of play determinations and locations of patrons, proactive instructions can be conveyed to the operators and/or staff to mitigate potential bottleneck issues and/or perform maintenance. In accordance with an example embodiment of the present invention, the data management tool 14 can determine and convey appropriate patron spacing to the operator (e.g., via operator device(s) 18). For example, the data management tool 14 can instruct the operator to increase patron start time spacing to 13 minutes for the next hour. Similarly, the data management tool 14 can instruct the operator or directly warn patrons (e.g., via sensor device(s) 10 and/or patron device(s) 20) participating in a particular activity or sub-activity that they may have to skip an activity or sub-activity if their pace does not improve. For example, patrons on the 9th hole of a golf course can be warned that they will have to skip a hole if they don't improve pace by 10 minutes.

In accordance with an example embodiment of the present invention, the proactive instructions related to patron positioning can take into account maintenance tasks being performed or scheduled to be performed. For example, if a particular identified gap is ideal for required maintenance, then the maintenance assignment will be prioritized over the assignment of a patron to relieve congestion and staff will be dispatched to perform the maintenance assignment. The priority can be adjusted according to user preference, a level of congestion, etc. Similarly, more or less spacing between patron start times can be adjusted to account for maintenance being performed or to be performed.

In accordance with an example embodiment of the present invention, the data management tool 14 provides pre-emptive mitigating instructions to an operator to prevent potential issues. The data management tool 14 utilizes historic data and live location and time data of patrons when prioritizing a point of entry and start times for patrons. For example, if a patron historically takes an hour to complete an activity or sub-activity at the activity venue, then the data management tool 14 recommends allocating a larger space (e.g., tee off time) between that particular patron and the next patron and/or place the particular patron at a point of entry with a larger gap. As would be appreciated by one skilled in the art, the data management tool 14 can also schedule start times and points of entry based on historic data, projected paces, and live traffic, as discussed herein, to prevent potential issues. Similarly, the data management tool 14 can also schedule maintenance to be performed based on any combination of historical and live location and time data.

In accordance with an example embodiment of the present invention, the data management tool 14 enables patrons to have flexible scheduling methodologies not offered in traditional system. Reservations for participating at an activity venue are booked based on an amount of time available to the patrons. For example, golfers are able to use a tee time system to book golf by the amount of time they have to play (e.g., ninety minutes) or a number of holes not equal to the typical nine or eighteen hole construct. This flexible scheduling allows golfers to plan their play around their busy schedules and play more frequently, thus increasing revenue for the golf course. As would be appreciated by one skilled in the art, these methodologies can be applied to other types of activities as well.

In accordance with an example embodiment of the present invention, the data management tool 14 is configured to perform revenue optimizations in conjunction with the traffic/scheduling optimization for an activity venue. The revenue optimization can include metrics for balancing supply and demand of patrons participating at the activity venue for a given period of time and maintenance tasks to be performed for maximized revenue. For example, the data management tool 14 can identify periods of time that are historically busy or underutilized and charging a premium during busy periods, or providing a discount during underutilized periods of time. Similarly, the data management tool 14 can schedule and/or dispatch staff for routine maintenance and low priority maintenance tasks to be performed during lower utilization periods while limiting only high priority/critical maintenance to be performed during high utilization of the venue. Additionally, the data management tool 14 can also take the predetermined pace of play for the participating patrons into account along with the supply and demand. The revenue optimization can include combining an optimal price point for periods of time and an optimal throughput of the patrons, used in conjunction with the traffic control metrics. For example, the data management tool 14 recommends greens fee pricing for busy times based upon target pace and other factors in order to decrease) demand during the busy times. As a result, the overall revenue during these times will increase.

Once a revenue optimization has been determined, the data management tool 14 provides instructions to operators and staff members (e.g., via the operator device(s) 18) at the activity venue to implement the optimizations and/or scheduled maintenance tasks. The instructions can include a target price or price range, time periods for scheduling patron start times (e.g., how much time to schedule between patrons to optimize traffic flow), and time periods/locations to perform particular maintenance tasks. The instructions allow the operators to implement the modeled pricing to drive the appropriate demand and income that will yield a target pace during busy times and a different target price during less busy times. Similarly, the instructions provide operators organized maintenance schedules for maintaining the venue without interfering with patrons participating at the venue. In addition to determining a target price point based on patron and venue activity levels, the data management tool 14 can recommend offers to engage patrons and give the activity venue the enhance customer relationships.

In accordance with an example embodiment of the present invention, the data management tool 14 is also configured to use patron tracked activities to provide payment solutions to the activity venue. As discussed with respect to FIGS. 2A and 2B, the sensor device(s) 10 can include embedded payment methods, which can be accessed by the venue gateway device 12 and the data management tool 14. The data management tool 14 can automatically charge the patron based on a number of activities or sub-activities completed by the patron (e.g., using a payment chip linked to a credit card). As would be appreciated by one skilled in the art, the data management tool 14 can determine when a patron has completed activities or sub-activities by using location information of the patron's sensor device 10. For example, a venue sensor device 10 can be placed at a beginning and/or end of each activity or sub-activity and when a patron's sensor device 10 comes within and/or is located within a predetermined range of the venue sensor device 10 (e.g., 3 feet) the task will be indicated as complete.

In accordance with an example embodiment of the present invention, the sensor device(s) 10 is used as, or is incorporated into, a loyalty card and the data management tool 14 can track a particular patron's usage at a particular venue. The loyalty card tracking grants the patron access to special start times, discounted pricing, forecasts a completion time and up-to-date expected completion time (e.g., on patron device(s) 20). For example, the data management tool 14 can provide discount fee pricing to loyal patrons (and not other patrons) for less busy times to increase revenue during those periods.

In accordance with an example embodiment of the present invention, the data management tool 14 is configured to provide additional analysis for a particular type of activity venue. For example, additional metrics are provided that are related to day-to-day functions and maintenance of the activity venue, management of operators/staff members working the activity venue, providing information to patrons and operators/staff members throughout the activity venue, monitoring the status of items throughout the activity venue, weather conditions, etc. The additional metrics are utilized by the activity venue to create operational efficiencies by enabling workflow management for staff member activities. For example, the data management tool 14 systematizes operating procedures for staff members, allowing the operators to hire lower cost resources and that do not require as much training to perform the desired tasks (e.g., customer relations, maintenance, clerical, cashier, etc.). The data management tool 14 can tell the lower cost staff member (e.g., high school or college students) what staff member activities/tasks to carry out in response to events that are currently occurring and/or are predicted to occur in the future.

In accordance with an example embodiment of the present invention, maintenance vehicles at an activity venue (e.g., maintenance vehicles on a golf course) are equipped with sensor device(s) 10, operator device(s) 18, and/or venue asset devices 22a. The combination of sensor device(s) 10 and operator device(s) 18 associated with maintenance vehicles (or other equipment) can be utilized to track locations of maintenance staff, vehicles, and equipment. As would be appreciated by one skilled in the art, the locations of maintenance staff, vehicles, and equipment can be tracked by the data management tool 14 in a similar manner as the patrons.

As discussed with respect to FIGS. 2A and 2B, the sensor device(s) 10, operator device(s), 18 and/or venue asset devices 22a can include accelerometers that can detect vibration during vehicle operation, and the detected vibration can be used to determine how many hours the vehicle has been running. As would be appreciated by one skilled in the art, the sensor device(s) 10, operator device(s) 18, and/or venue asset devices 22a transmit a signal periodically indicating that the vehicle is being operated, transmit a single signal with a duration of operation once the operation of the vehicle has stopped, and/or any other known methods for indicated the amount of time that a vehicle has been running. The running time of the vehicle, and other collected data, are used by the data management tool 14 to, for example, project maintenance schedules and recommends an optimal time to perform maintenance to the vehicle. Accordingly, the data management tool 14 utilizes collected data to optimize vehicle up time while reducing maintenance costs. Additionally, the data management tool 14 can aggregate the location and time data associated with the operator device(s) 18 and/or venue asset devices 22a with the vehicle for use with the aggregated patron, staff, and operator location and time data.

In accordance with an example embodiment of the present invention, the present description makes use of an example for an activity venue of a golf course. However, this illustrative example of a golf course is not intended to limit the present invention to being applicable only to a golf course as the activity venue. Rather, the illustrative example of a golf activity is merely intended to better communicate various features and characteristics associated with the system 100 and the use of the system 100 in a particular activity venue, as well as detail specific configurations and implementations that are applicable to a golf course implementation. As would be appreciated by one skilled in the art, the data, analytics, and metrics that pertain to the example implementation on a golf course can be modified to include data, analytics, and metrics to suit a different activity venue, such as a ski resort or amusement park.

With respect to the example of a golf course, the data management tool 14 collects data from sensor device(s) 10 and patron device(s) 18 to deliver value across several golf course operational service operators and patrons (e.g., golfers). For example, the data management tool 14 can deliver valuable data to operators/staff members related to tee time management, starter management, live traffic control, an operational dashboard, predictive analytics, course setup, grounds and maintenance.

For the starter management, the data management tool 14 can assign golfers together based on compatible availability and historical pace of play. In particular, the data management tool 14 can assign groups of golfers that share similar historical pace of play times. For the tee time management, the data management tool 14 can track historical usage patterns and productive analytics to determine the optimal tee times for golfers. For example, for golfers with efficient pace of plays, a smaller start time gap between gofers can be provided than for golfers with slower pace of play times. For the live traffic control, the data management tool 14 can provide an interactive course map. As would be appreciated by one skilled in the art, the live traffic control can include heat maps, an ability to zoom in and out, among other features to assist in visualizing patron traffic flow and congestion to users (e.g., operators).

For the operational dashboard the data management tool 14 can display key statistics for golf course and individual holes (e.g., congestion, patron locations, etc.). For predictive analytics, the data management tool 14 can provide instructions for proactive management of patrons. For example, the data management tool 14 can provide instructions to golfers that they are behind pace, instructions to start play at a particular gap in the golf course, instructions to allocate additional time between tee offs, etc. For course setup, the data management tool 14 can provide information to patrons about the course (e.g., pin placements, speed of greens, length of the rough, etc.) to assist in optimizing the golfer's pace of play. Additionally, the data management tool 14 can monitor current weather and providing advisory notifications to patrons. For example, an outdoor venue may send notifications of approaching thunder storms to all patrons at the venue.

The present invention can further include department specific metrics/analytics for a given venue. For example, a golf course can have department specific metrics for maintenance/grounds department. The grounds department may receive information for machine management to track usage and locations of machinery around the golf course, maintenance schedules to track maintenance processes to be carried out by the maintenance staff (e.g., track grass length, green speed, etc.), track wear and tear with a focus on high traffic zones and landing areas, watering system to centrally manage each individual watering system, and course modifications to plan major course changes and to project impact of those changes on scoring and pace of play. Additionally, operators will be able to measure the effectiveness of caddies and maintenance staff, as discussed herein. The system 100 can also manage golf cart utilization to better balance fleet usage. For example, cart management can provide re-routing and/or shut off carts based on location and time data gathered from devices associated with the carts.

In accordance with an example embodiment of the present invention, the sensor device(s) 10 or venue asset devices 22*a* are connected to sprinkler heads throughout the golf course. The sensor device(s) 10 or venue asset devices 22*a* attached to sprinkler heads, or other portion of the sprinkler, to enable the data management tool 14 to monitor the relative health (i.e., are they working or operating efficiently) of the sprinkler heads. The data received from the sprinklers can be used to improve maintenance and operations at the golf course. In accordance with an example embodiment of the present invention, the data management tool 14 and/or the venue gateway device 12 sends instructions to start and stop operation of the sprinkler systems based upon the activity around the golf course. For example, on hot days the sprinkler systems are activated to water areas during periods of time when there are no patron device(s) 20, 22*b*, 22*c* within a predetermined vicinity of the sensor device(s) 10 or venue asset devices 22*a* in those areas, thus signaling a period of inactivity. The data management tool 14 can utilize traffic patterns and pace of play of patrons to predict gaps in patron activates and provide instructions to initiate the sprinklers during the gaps and provide instructions to turn off the sprinklers when patrons are approaching that area of the course. As would be appreciated by one skilled in the art, the instructions can automatically turn the sprinklers on or off, or can send instructions to an operator of the course to turn on or off the sprinklers.

Figure 3A:
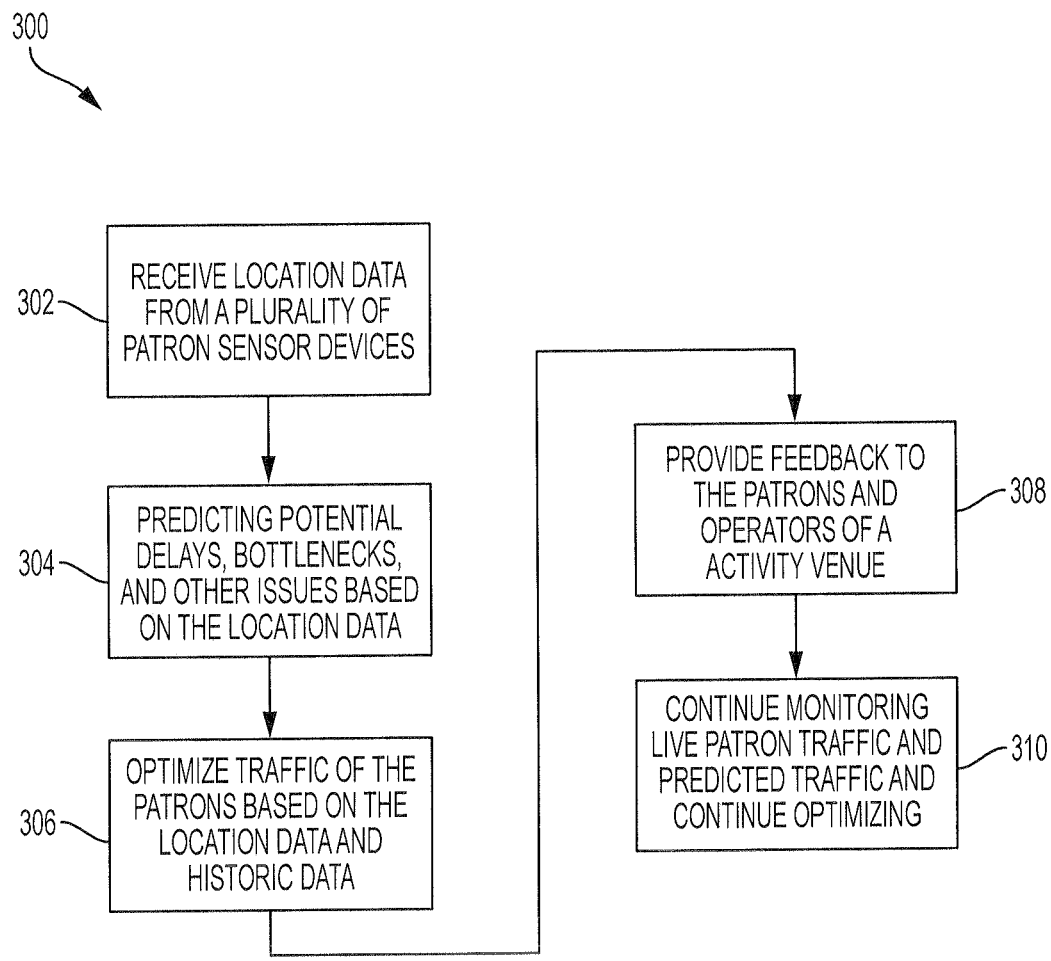
FIG. 3A is an illustrative flowchart depicting operation of the venue management system, in accordance with aspects of the invention.

FIG. 3A shows an exemplary flow chart depicting implementation of the present invention. In particular, FIG. 3A depicts actions performed by the data management tool 14 in conjunction with the other components of the system 100 during process 300. At step 302, the data management tool 14 receives location and time data from a plurality of patron sensor device(s) 10 and/or other devices 18, 20. At step 304, the data management tool 14 uses the received data to predict potential delays, bottlenecks, and other issues based on the location and time data. At step 306, the data management tool 14 optimizes a traffic flow of the patrons based on the analysis of the location data, time data, and historic data. At step 308, the data management tool 14 provides feedback to the patrons and operators at an activity venue based on the completed analysis. At step 310, the data management tool 14 can continuing monitoring the location and time data provided by the sensor device(s) 10 at the activity venue and re-optimize accordingly.

Figure 3B:
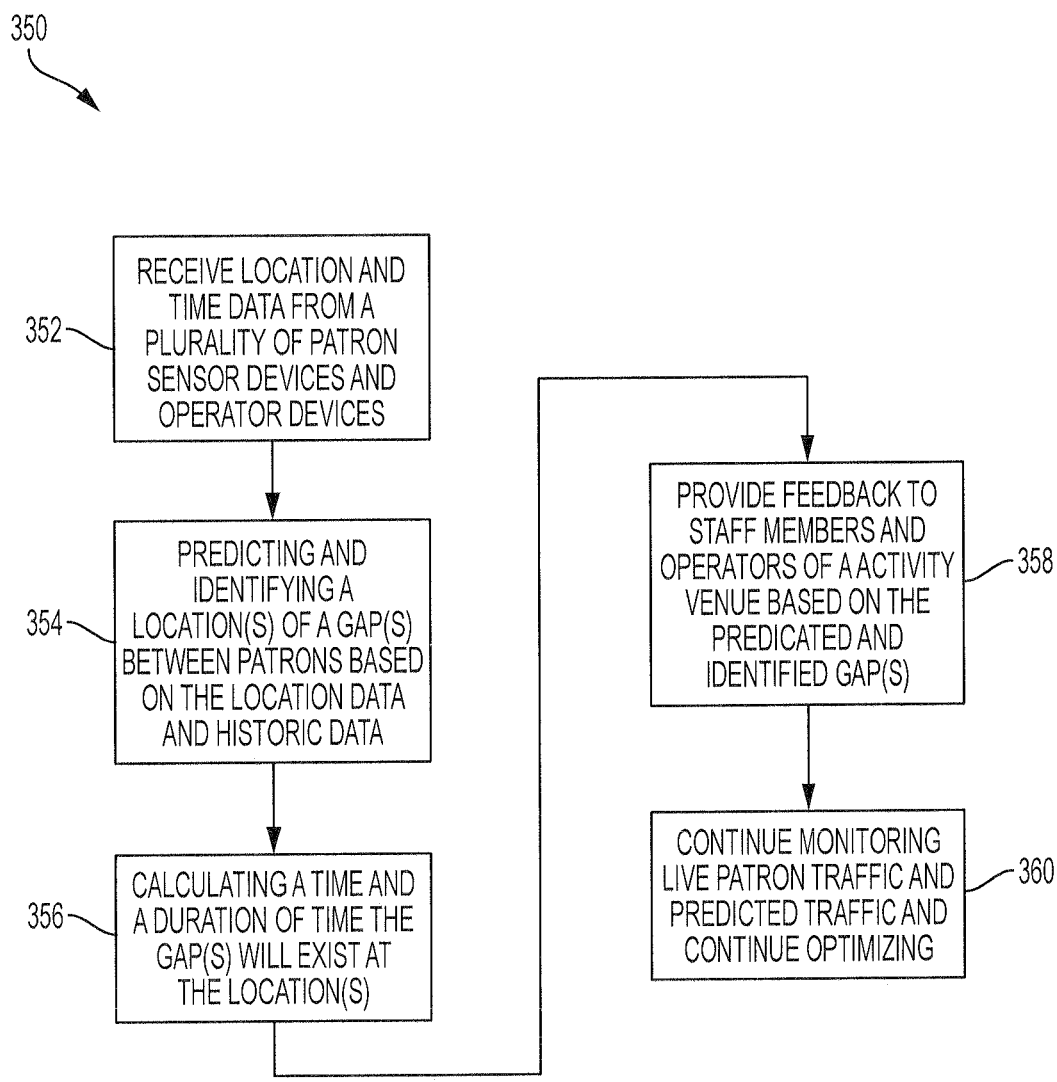
FIG. 3B is an illustrative flowchart depicting operation of the maintenance management system, in accordance with aspects of the invention.

FIG. 3B shows an exemplary flow chart depicting an example implementation of the present invention. In particular, FIG. 3B depicts actions performed by the data management tool 14 in conjunction with the other components of the system 100 during process 350. At step 352, the data management tool 14 receives location and time data from a plurality of patron sensor device(s) 10 and operator devices 18. At step 354, the data management tool 14 uses the received data to predict and identify a location(s) of a gap(s) between patrons based on the location and time data and historical data, as discussed with respect to FIGS. 1, 2A, 2B, and 3A. At step 356, the data management tool 14 calculates a time and duration of time that the gap(s) will exist at the location(s).

At step 358, the data management tool 14 provides feedback to the staff members and operators at an activity venue, based on the predicted and identified gap(s). In accordance with an example embodiment of the present invention, the feedback includes indicating maintenance tasks to be performed in the identified gap(s). As would be appreciated by one skilled in the art, the data management tool 14 can maintain a list of maintenance tasks that need to be completed at various locations at the venue and a duration of time needed to complete those tasks. Utilizing to list of maintenance tasks and the predicted and identified gap(s) the data management tool 14 can match the appropriate maintenance task(s) to be performed at the identified gap. Similarly, the data management tool 14 can dispatch the appropriate staff member to perform the maintenance task. The dispatching of the staff member can be determined based on proximity to the gap, availability of the staff member, the skill level of the task to be complete, or a combination thereof. At step 360, the data management tool 14 can continuing monitoring the location data of the sensor device(s) 10 and operator devices 18 at the activity venue and provide maintenance feedback to staff members and operators accordingly.

Example Golf-Course-Specific Implementation

In operation, the system 100 can be configured for operation on a golf course. In particular, in an illustrative example, the system 100 is configured to provide analytics and metrics specifically related to the golf course and activity on the golf course. For example, in accordance with the exemplary golf course embodiment of the present invention, the system 100 of the present invention utilizes algorithms and analytics specifically designed to formulate metrics related to pace of play of players on the golf course. The metrics calculated by the system 100 related to pace of play can further be utilized to determine other functions on the golf course. In one example implementation, the pace of play of patrons on the golf course can be utilized to determine when and where to perform maintenance tasks on the golf course (and dispatch maintenance staff accordingly). For example, the pace of play of patrons can be utilized by the system 100 to derive traffic patterns of the patrons, predict a location and time of gaps in play between patrons, and assign/dispatch maintenance tasks to be executed by staff during those predicted gaps. Similarly, the metrics calculated by the system 100 can indicate which player or group of players are playing quickly or slowly, how much time a player or group of players waits on shots for a player or group of players ahead to clear an area, or an average time it takes a player or group of players to play various shots and clear various areas (e.g., particular holes or greens). The following exemplary embodiment is discussed with respect to utilization on a golf course to derive various metrics on the golf course (e.g., pace of play), however, the system 100 and the algorithms utilized thereon can be customized to be applied to other activity venues, as discussed herein, and is not intended to be limited to use on a golf course unless specific to particular golf implementation features. For example, similar algorithms can be used to predict pace of play and other measures for venues such as miniature golf courses, ski resorts, amusement parks, etc.

In accordance with an example embodiment of the present invention, the system 100 aggregates data, calculates various metrics, and performs analytics related to activities on the golf course. For example, the system performs analytics on aggregated data to determine a pace of play for each player on the golf course. The calculated metrics for pace of play can be related to a pace of play for a particular course, particular hole, a particular golfer, a particular group of golfers, etc. The system 100 utilizes a combination of historical data and live data (e.g., location data, time data, etc.) gathered from the sensor device(s) 10, the venue gateway device 12, the operator device(s) 18, patron device(s) 20, etc. to calculate the pace of play metrics and other metrics using a unique combination of algorithms. In accordance with an example embodiment of the present invention, each player who participates in a round of golf while utilizing the system 100 is assigned a pace of player rating that reflects that particular player's pace of play to be stored by the system 100 (e.g., by the data management tool 14). The collection of the all the pace of play metrics for all players can be useful for the system to improve the play experience of players while maximizing efficient utilization of the golf course. Such improvements can be manifested in the form of scheduling, teaming, maintenance and evaluation purposes.

For golf courses and players there are a number of factors that can contribute to a player's pace of play. The system 100 of the present invention can collect data from the sensor device(s) 10, the patron device(s) 20, and operator device(s) 18, etc. and calculate metrics to identify and account for such factors. In particular, when calculating a pace of play for a player, a number of factors must be weighed in order to fairly represent a player's pace of play. For example, to fairly predict a player's pace of play, the system 100 adds a player's preparing/hitting time to the player's moving time and subtracts any waiting time incurred by the player (e.g., time waiting for other players to clear the area). An example formula for such a calculation can be written as $TT(i,j)=T(i,j)-WW(i,j)$ where i is a group number, j is a hole number, n is a cage number, $TT(i,j)$ is a true playing time (a play time minus a wait time) to play Hole j by Group i, $T(i,j)$ is the actual time duration group i took to play Hole j, and $WW(i,j)$ is the total wait time for group i on hole j for all cages 402 on hole j. This calculation accounts for delays caused by other players that impeding how long it takes a particular player to complete a hole and/or course.

As would be appreciated by one skilled in the art, the system 100 utilizes the combination of devices discussed herein to perform the calculations related to pace of play determinations. For example, the data management tool 14 of the system 100 can utilize any combination of data collected from the sensor device(s) 10, the patron device(s) 20, and operator device(s) 18 to derive the metrics for calculating the pace of play for the players and other metrics. In particular, the system 100 aggregates location and time data collected from sensor device(s) 10, the patron device(s) 20, and operator device(s) 18 via the venue gateway device 12, and performs analytics on the data utilizing the data management tool 14. As would be appreciated by one skilled in the art, the data management tool 14 can utilize a plurality of algorithms specifically designed to calculate a pace of play for players, groups of players, expected pace of play for courses, and other desirable metrics.

In accordance with an example embodiment of the present invention, when determining a pace of play metric and other metrics, the system 100 accounts for a number of factors that include but are not limited to player behavior, course conditions, and management decisions. Player behavior includes collecting data related to whether each player is ready to hit when it is their turn to hit, whether the player moves directly to their own ball, and how long the player takes to actually hit the shot. Similarly, group behaviors include collecting data related to whether a group of players plays ready golf, whether the group uses their cart(s) wisely, whether the group waves up parties waiting behind them on par 3s (e.g., when the group is playing at a slower pace than the group behind them), when the group is a waiting for other parties to clear an area while on the tee, etc. As would be appreciated by one skilled in the art, all of these behaviors can be tracked, analyzed, and calculated by the system 100 using data collected from sensors/devices around the golf course.

Additionally, the course conditions include collecting data related to the length of the course, a difficulty level of the course, a width of the fairway(s), an amount of obstacles on the course, a height of the rough, the speed of the green(s), a number of bunkers, and amount of water hazards. As would be appreciated by one skilled in the art, each criterion related to course conditions can add shots to a round of golf and added shots add time. In accordance with an example embodiment of the present invention, each golf course has a course standard time rating for each size group based on the course conditions associated with that golf course. The course standard time is calculated by the system 100 using an algorithm applied to the specific course conditions for the course or can be calculated based on the actual play times of players on the course. An example formula for such a calculation can be written as $A(i,j)=\max P(i,k,j,Green)$ for all k players in the group, where i is a group number, k is the player number in group i, j is a hole number, and $P(i,k,j,Green)$ is the crossing green clock time for each player k in group i that finishes hole j. If more than one crossing for a player occurs, the system 100 uses the maximum of all P(I,k,j)s, saving the last time the player crossed, namely we the player left the cage. This formula indicates when the last player crossed out of the green cage for hole j, as discussed in greater detail herein.

As would be appreciated by one skilled in the art, the course standard time can be adjusted based on other factors. For example, the time of day, time of year, weather, etc. can all influence the calculated course standard time. In accordance with an example embodiment of the present invention, the calculated course standard time is used as a bar for comparing and predicting expected pace of play for players on that course. Additionally, group size is a determining factor on the expected pace of play. For example, the larger the group, the more delays that can be caused. The greater the number of groups on the course, the longer it will take to play. The real-time pace, skills, and interests of the golfers on the course at any given time will also be a factor.

Management

In accordance with an example embodiment of the present invention, the pace of play metrics can further be utilized to for various management decisions related to the golf course. The management decisions include the course setup, the tee interval, and whether course management provides pace instruction, feedback, ranger instructions to players on the course, course maintenance schedules, maintenance staff deployment based upon player gaps on the golf course, architectural changes to the golf course, an amount of water required, number of new members to add to a private country club without impacting existing members, determine optimal drop-in points where players can start their round without impacting play of others, and enable shorter format play (e.g., play for an hour or three to four holes).

As would be appreciated by one skilled in the art, there are numerous configurations that the system 100 can utilize to aggregate and analyze data from the golf course to calculate a pace of play value. FIGS. 4A-4D depict example embodiments of configurations for capturing precise player movement data to be used by the system 100 analytics to derived the various metrics discussed herein. In accordance with an example embodiment of the present invention, the system 100 implements cages 402 and/or arcs 406 to provide precise data on player movement on the holes and the course, as depicted in FIGS. 4A-4D. In particular, the cages 402 and/or arcs 406 are utilized by the system 100 to gather specific location and time data about player activity on a golf course to be used in the algorithms for calculating pace of play metrics.

In accordance with an example embodiment of the present invention, the cages 402 are virtual or computer generated cages 402 in that they are established on a computer or computer network as predetermined electronic zones technologically set up at specific locations on the golf course and/or holes 400. For example, the data gathered throughout the golf course virtual or computer generated cages 402 can be created by identifying specific locations as an overlay on an electronic mapping of the golf course. In particular, the cages 402 are predefined areas where players are expected to hit to or from. For example, the cages 402 are set up around all tees and putting surfaces throughout the golf course. The cages 402 are also set up in fairway areas where players are likely to hit to and/or will be forced to wait if a group ahead is still in the next cage. Similarly, the cages 402 can be set up to include portions of the cart path adjacent to the target areas (e.g., via the sensor tee off, fairway, green, etc.) in order to provide tracking for the golf carts and alert players of restricted areas on the golf course.

As would be appreciated by one skilled in the art, the cages 402 can be defined using physical sensors on the golf course. However, in accordance with the illustrative embodiment described herein, the cages 402 are defined by the system using geolocation technology and virtual or computer generated boundaries understood by the system 100. Conceptually, for a user to understand the location of the cages 402, they can be represented as boundaries on a map overlaying the golf course, as depicted in the corresponding FIGS. 4A-4D. The cages 402 are utilized by the system 100 for identifying locations and times that a player enters and exits the cages 402. Tracking when a player crosses into a cage 402 enables the system to monitor the position and pace of each player/group. As would be appreciated by one skilled in the art, the cages 402 can be implemented using any combination of hardware and software known in the art.

In accordance with an example embodiment of the present invention, the cages 402 are setup using geolocation coordinates. The geolocation coordinates can be defined by a computer to create the boundaries designating an area for the cages 402. The locations for the cages 402 and the cages 402 respective geolocation coordinate defined boundaries can be created, assigned, or identified and stored on the system 100. For example, an administrative user can manually enter geographical coordinates into a user interface, draw out the boundaries on a map of the golf course within the user interface, or utilize any method understood by those of skill in the art for assigning a geographical area/boundary. Additionally, the system 100 can have rules in place to prevent the boundaries of the cages 402 from overlapping with one another. Similarly, the cages 402 can be setup using hardware devices (e.g., sensor device(s) 10) to setup a perimeter points (e.g., boundary) for the cages 402.

The cages 402 are utilized by the system 100 to identify when a player enters and exits a particular area of the golf course (or when a golf carts enter/exit a portion of the cart path) and to identify the relationship of that player to other players on the course. In particular, the system 100 recognizes and records a clock time and an identifier of a cage 402 when a player crosses the predefined electric boundary established for the cage 402. For example, when a player enters a cage 402 defined by the geolocation coordinate boundary associated with that cage 402, the system 100 records the time that the player has passed the boundary for that particular cage 402. Similarly, when that player leaves the area defined by a cage 402, the system 100 records the time entry data for the exit. The crossing (e.g., entering/exiting a cage 402) time entry data at each cage 402 for that player is used by the system 100 to calculate the pace of play metrics and measure the time it takes to complete activities (i.e. complete a hole) versus benchmarks for comparison purposes.

Depending on the particular activity venue or sub-activity, the cages 402 can be set up by the system 100 at different predetermined locations. For example, for the golf course implementation, cages 402 art set up at the tee off location(s) and the green for each hole on the golf course or the driving range or parking lot or other designated areas (to track who/what is in those zones). Additionally, for longer holes, additional cages 402 are set up based on the distance of those holes. For example, for holes less than 440 yards, a fairway cage is set up between the tee off area(s) and the green and for holes over 500 yards, another fairway cage is set up a predetermined distance between the first fairway cage and the green. As would be appreciated by one skilled in the art, each of the cages 402 are associated with a unique identifier, such that the system 100 can determine which cage(s) 402 on which holes are being entered/exited by each player at which times and how long players spend playing a specific hole, clubhouse, the driving range, etc.

FIGS. 4A and 4B depict example implementations of cages 402 positioned on a hole 400 of a golf course. As discussed in greater detail herein, the cages 402 are used to gather data when a player crosses a boundary defined the geolocation points associated with the cage 402. The cages 402 are used by the system 100 to calculate various metrics such as pace of play for a player or a group of players. The gathered data can include the identifier associated with the cage 402 being crossed, geolocation of the cage 402 being cross, and a clock time in which the crossing occurred. An example formula for such a calculation can be written as P(i,k,l,Tee), where i is a group number, k is the player number in group i, j is a hole number, and calculates a crossing start clock time that a player k in group i crossed out of the first hole tee start cage. As would be appreciated by one skilled in the art, the data can be gathered using any combination of hardware and software discussed in system 100 and/or known in the art.

FIG. 4A depicts an example implementation in which boundaries for the cage 402 zones are setup on a hole 400 of a golf course, represented by the dashed lines. As depicted in FIG. 4A, each cage 402 is defined by geolocation coordinates 404. For example, the cages 402 can be defined by longitude and latitude coordinates on a map. In accordance with an example embodiment of the present invention, the cages 402 and their respective coordinates 404 are further defined by where the cage 402 is located on a particular hole 400. In particular, the cages 402 can be defined as a tee box cage 402a, a green cage 402b, and a fairway cage 402c at each hole 400, as depicted in FIG. 4B. As would be appreciated by one skilled in the art, the cages 402 can also be defined by locations on a golf course (e.g., first hole tee off, second hole green, third hole fairway, driving range, parking lot, etc.), additional locations on a hole 400, etc.

Figure 4C:
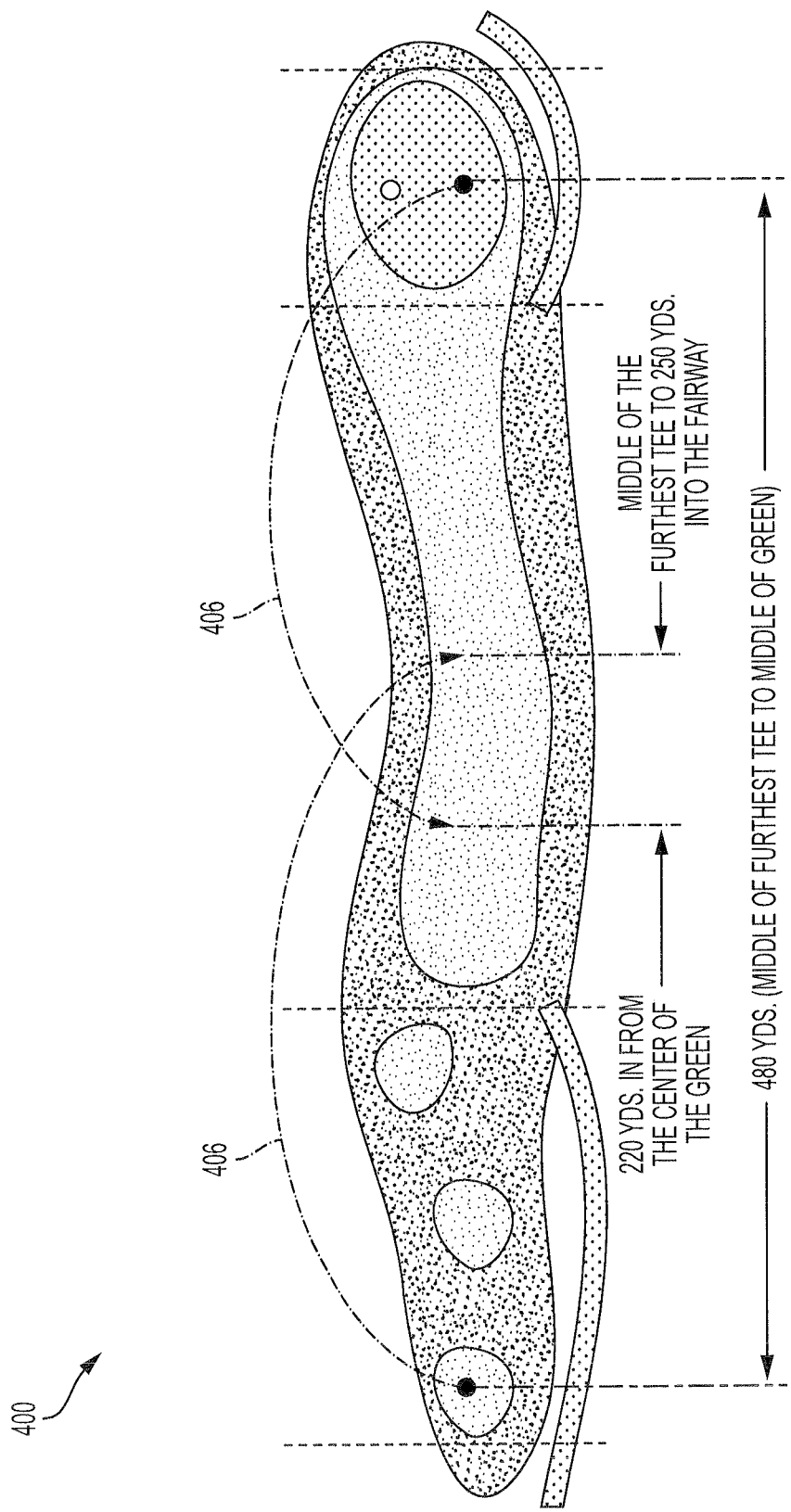
Figure 4D:
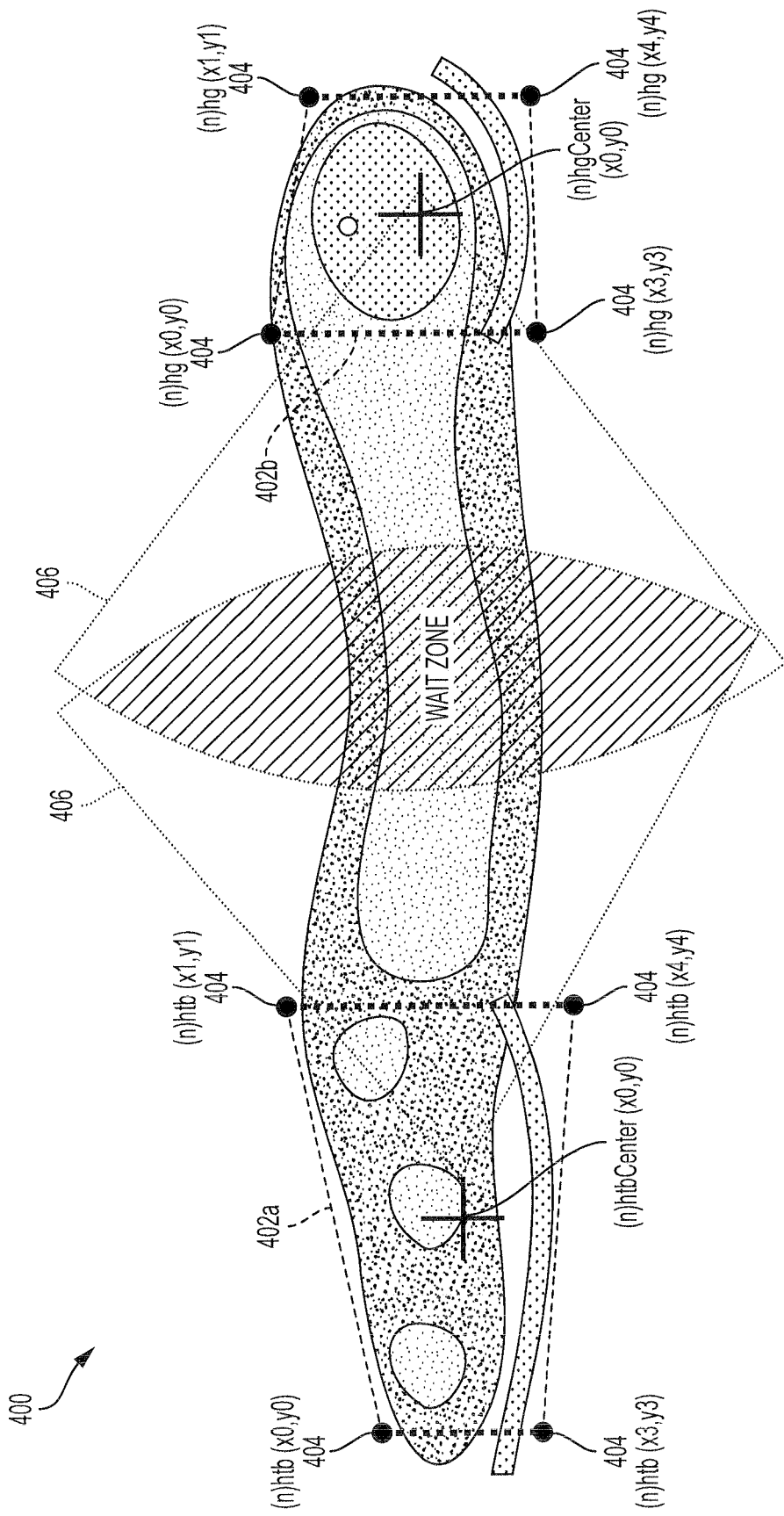

In accordance with an example embodiment of the present invention, arcs 406 are used in combination with the cages 402 to capture precise player movement and other data (e.g., wait times) on each hole 400 of the golf course. Overall the arcs 406 share a similar to functionally to the cages 402. The arcs 406 are defined by the system 100 to cover predefined areas, distances, and/or boundaries arcing from key locations on a hole 400. For example, the arcs 406 can include a cone shaped area originating from a predetermined distance from key locations on a golf course (e.g., cage 402 locations). The key locations can include tee off locations, mid fairway points, and the green for each particular hole 400 on a golf course. The boundaries for the arcs 406 can defined by establishing a predetermined distance from a point of interest (e.g., tee off, green, or fairway position) as depicted in FIG. 4C or a establishing a predetermined distance radius from a point of interest as depicted in FIG. 4D. In accordance with an example embodiment of the present invention, the arcs 406 are virtual or computer generated predetermined distances extending from locations within the cages 402. The predetermined distances can determined by industry experts or the course operator and are established on a computer or computer network as arcs 406 technologically set up at specific locations on the golf course. For example, the virtual or computer generated arcs 406 can be created by identifying specific locations as an overlay on an electronic mapping of the golf course.

In accordance with an example embodiment of the present invention, the arcs 406 are used to create and/or provide locations for fairway cages 402c. In particular, the arcs 406 define at what distances to position the fairway cages 402c based on a projected distance that a ball may travel (e.g., from a tee off). For example, as depicted in FIGS. 4C and 4D, an arc 406 from the tee off cage 402a is defined by a maximum distance a tee shot will travel (e.g., 250 yards), the next arc 406 will define the maximum distance the next shot will travel (e.g., 220 yards) to reach the next cage 402 (e.g., the green tee cage 402b), and so forth. The fairway cages 402c will be created at points in which the arcs 406 overlap. In instances where arcs 406 on a hole do not intersect, cage 402 will be created by the end of two arcs 406 (e.g., from the tee and one from the green). For example, the arcs 406 can define locations for cages 402 at 250 yards out from the tee cage 402a and at 250 yards from the green cage 402b, as defined by the respective arcs 406.

In accordance with an example embodiment of the present invention, as depicted in FIG. 4D, the system 100 can utilize a combination of the cages 402 and the arcs 406. In particular, the cages 402 and/or arcs 406 are utilized in combination to gather data for the system 100 to track and record events and derive metrics related to where and when a player is located and in relation to other players within a particular hole 400 within a golf course. The data is gathered by the system 100 by tracking and recording events related to the cages 402 and/or arcs 406. For example, the tracked events can include when a player enters or exits a boundary defined by the cages 402 and/or arcs 406.

In accordance with an example embodiment of the present invention, the system 100 can identify and track events related to when a player/group crosses a boundary for a particular cage 402 and/or arc 406. The events include but are not limited to when a player enters a tee box cage (e.g., cage 402a), when a player exits a tee box cage, when a player enters a fairway cage (e.g., cage 402c), when a player exits a fairway cage, when a player enters a green cage (e.g., cage 402b), when a player exits a green cage, when a player enters a courtesy arc (e.g., arc 406), and when a player exits a courtesy arc. As would be appreciated by one skilled in the art, there are multiple systems and methodologies that can be used to track an individual player/group crossing a particular boundary.

In accordance with an example embodiment of the present invention, the crossing of a boundary of a cage 402 or arc 406 is tracked by recording a location of a player/group at a particular point in time by periodically pinging the patron device 20 and/or sensor device 10 carried by that player throughout the golf course and record a location of that device (e.g., patron device 20, sensor device 10, etc.) at the time of the ping. After each ping, the system 100 determines whether the player is located within or outside a cage 402 or arc 406 and records the location and time when warranted. In particular, the system 100 records a clock time when a player first identified as being located in a cage 402 and/or arc 406 (e.g., the first ping recorded in a cage 402 and/or arc 406) and a clock time when that player leaves that cage 402 and/or arc 406 (the first ping recorded outside a cage after recording a ping inside a cage 402 and/or arc 406). Additionally, the first ping for a player inside a cage 402 and/or arc 406 is recorded as the clock time that the player entered the cage, such that if the player exits and re-enters the same cage 402 and/or arc 406, the first clock time is still the entry clock time. Similarly, system 100 takes the highest (latest) ping clock time for a player outside a cage having the previous ping inside the cage to indicate when the player last left the cage. As would be appreciated by one skilled in the art, the pings and data associated therewith can be stored by the system 100 in a database for further analysis.

The data gathered in relation to the cages 402 and/or arcs 406 is utilized by the system 100 to provide metrics based on the precise location and movement data gathered for players/groups on the course. In accordance with an example embodiment of the present invention, the system 100 tracks how long a player/group spends "dwelling" in a particular cage 402 and/or arc 406. In particular, the system 100 can calculate a dwell time by recording an entry time when the player/group initially crosses a boundary for a cage 402 and/or arc 406 and a time when the player last exits the cage 402 and/or arc 406 (re-crosses the predefined boundary). The dwell time is the total time that a player or group spends within a cage 402 and/or arc 406. The system 100 can derive the dwell time by calculating the difference in the player's entry time and the exit time from a cage 402 and/or arc 406 (e.g., subtracting the entry time from the exit time). An example formula for such a calculation can be written as $L(i,k,j,n)=Pmax(i,k,j,n)-Pmin(i,k,j,n)$, where i is a group number, k is the player number in group i, j is a hole number, n is a cage number on the hole j, $L(i,k,j,n)$ is the dwell time at cage n on hole j for group i, $Pmax(i,k,j,n)$ is the final crossing clock time for player k in group i, on hole j for exiting cage n, and $Pmin(i,k,j,n)$ is the first crossing clock time for player k in group i, on hole j for entering cage n.

As would be appreciated by one skilled in the art, it is possible to have a player/group cross boundaries for the cages 402 and/or arcs 406 several times and the system 100 can be configured to account for such situations. For example, the system 100 can store only the minimum crossing time (a first crossing time) to indicate arrival at a cage 402 and/or arc 406 and the maximum crossing time (the last crossing time) to indicate exit from the cage 402 and/or arc 406. The system 100 stores the first crossing reading as the minimum crossing time and then the subsequent crossing time would be stored as the maximum crossing time with each new crossing time replacing the previously stored maximum crossing time. The minimum crossing time and the maximum crossing time are utilized by the system 100 to calculate the total dwell time. For example, the system 100 subtracts the minimum crossing time from the maximum crossing time to derive the total dwell time.

In accordance with an example embodiment of the present invention, the cages 402 and/or arcs 406 are utilized by the system 100 to determine whether a player or group of players is waiting to play as a result of being impeded by another player or group of players. The system 100 determines that a player/group is impeded when that player/group is slowed by a player/group ahead of them on the course. For example, the system 100 determines if a first player/group is impeded when waiting for another player/group at a position ahead of them on a hole 400 to clear the area. Similarly, the system 100 determines that a player/group is impeding another player/group playing behind them.

In accordance with an example embodiment of the present invention, the system 100 determines when a player/group is impeding and/or is impeded by another player/group by comparing dwell times and locations information for those player/groups. In particular, the system 100 compares dwell times from one player/group in a first area compared to a dwell time for another player/group in an adjacent area ahead/behind the one player/group to determine whether there is any impeding occurring. For example, the system 100 can identify a player/group that has crossed into a first cage 402 or arc 406 (e.g., at a tee off location) that is waiting for a player/group in a next cage 402 or arc 406 (e.g., the fairway) ahead of them to clear the area (e.g., based on overlapping dwell times in the respective cages 402 or arcs 406).

As would be appreciated by one skilled in the art, the system 100 can utilize data collected from multiple cages 402 or arcs 406 to calculate wait times caused by any impeding from other players/groups. The system can calculate wait times by determining a time from when a player/group arrives at a cage 402 or arc 406 until the player/group ahead clears the next cage 402 or arc 406. For example, the system 100 records the amount of time a particular player/group (e.g., on the fairway) ahead of another player/group (e.g., at the tee off) has impeded the other player/group based on how long the particular player/group is occupying a cage 402 (e.g., on the fairway). In particular, the data gathered from the cages 402 and/or arcs 406 is utilized by the system 100 to track when a particular player has entered a particular area of the golf course, track when other players enter/exit an area immediately ahead or behind the particular area, when the other players are in cages 402 and/or arcs 406 ahead of the particular player are causing delays, and/or when the particular player is causing delays for a player or group immediately behind that player. As would be appreciated by one skilled in the art, the system 100 can add multiple wait times (e.g., a sum of the wait times at each of the cages 402 and/or arcs 406 on a hole) to derive a total wait time for that hole. The system 100 uses that data to calculate the wait times incurred by the impeding time period. An example formula for such a calculation can be written as $WW(i,j)=\text{sum of } W(i,j,n)$ where i is a group number, j is a hole number, and n is the cage number on the hole j, and $W(i,j,n)$ is the time group i waited for another group ahead to clear cage n on hole j.

In accordance with an example embodiment of the present invention, the system 100 can perform additional analytics to determine if a player plays faster or slower depending on whom the player is grouped with. Additionally, more precise measures derived by the system 100 can be used explain some of the waiting time for members of an individual player's group. In particular, using calculated dwell times, the system 100 can estimate how much time each individual players within a group is in a cage 402 and/or arc 406. The system 100 determines when each individual player enters and leaves the cage 402 and/or arc 406, calculates the dwell times for each player in the group, and derives an overall group dwell time at each cage 402 and/or arc 406. Subtracting out the calculated wait/impeded time caused by any other players/groups ahead of the individual player enables the system to calculate the true dwell time for each individual player. Subtracting out the wait/impeded time incurred by each individual in the group provides the true time the group takes to play a shot.

The system 100 can utilize the sum and averages of the dwell times for the individual players in the group and the overall group to provide metrics indicating which individuals complete their shots quickly and which do not. Similarly, this derived data can be used to identify which individual players in a group are slowing the overall pace of the total group. As would be appreciated by one skilled in the art, other data gathered by the system 100 may also be helpful in identifying the slow and/or fast player(s) in the group. For example, the system 100 can monitor movement speed when the players are traveling from shot to shot. The system 100 also identifies which player is first into a cage, which player is last, which player is first out, and which player is last out, which can be used to determine which players are faster/ slower. Additionally, data collected on specific players can be used to determine a players overall pace and establish a player pace rating.

In accordance with an example embodiment of the present invention, using the data gathered from the events related to crossing the boundaries, the system 100 derives a number of different metrics. The metrics can include but are not limited to a hole start time, a hole end time, a hole (benchmark) play time, a hole standard play time, a hole adjusted play time, a player/group (benchmark) play time, a player/group standard play time, a player/group adjusted play time, a course (benchmark) play time, a course standard play time, a course adjusted play time, and a pace of play. The system 100 can calculate and derive the various metrics using a combination of user entered and automatically obtained data (e.g., from devices 10, 20, etc.) from the golf course.

The hole start time is derived by identifying a clock time for when the player/group first crossed the boundary for a tee off cage 402 or arc 406 for a particular hole. For a group of players, the start time for the group is the clock time of when the first player in the group crossed the boundary. Similarly, the hole end time can be calculated by identifying the clock time when the player/group exits the green cage 402 or arc 406 for a particular hole. For a group of players, the end time is calculated using the clock time of when the last player in the group exits the final boundary (e.g., the green cage boundary). They system 100 can utilize the start times and the end times to calculate an overall play time the group takes to play a hole. For example, the system can subtract the start clock time from the end clock time to derive the actual play time of a hole for the player/group. Similarly, when calculating a pace of play for an entire round of golf, the system 100 will calculate a sum of the tee box to tee box time for each hole (which includes travel time between holes).

The hole benchmark play time is derived by the system 100 using various variables collected for a player/group. The variables can be related to day of the week, a time, a party size (e.g., single, double, threesome, foursome, etc.), carts/no carts, caddie, weather, type of play (i.e. normal play vs tournament play), etc. As would be appreciated by one skilled in the art, the variables used in calculating the hole benchmark play time can include any combination of manually entered variables (e.g., entered into the operator device 18) and/or automatically obtained variables. The hole benchmark play time is derived by the system 100 using historical data for the collected variables to determine an estimated amount of time it should take a player/group to complete a particular hole, based on the provided variables.

The hole standard play time is the play time based on the time it took the last player or group to complete a hole. Accordingly, the hole standard play time changes each time a player or group completes a hole. The hole standard play time is derived by the system 100 by calculating the actual play time that a particular hole is being played by players/groups regardless of wait times experienced. In particular, the hole standard play time is calculated by calculating a difference between the clock time of when the player/group exits the green cage 402 or arc 406 (e.g., the green cage time(s)) for each player or group from the clock time of when the player/group exits the green cage 402 or arc 406 (e.g., the green cage time(s)) from the previous hole). An example formula for such a calculation can be written as $T(i,j)=A(i,j)-A(i,j-1)$ [First hole is $A(i,j)-S(i)$], where i is a group number, j is a hole number, $T(i,j)$ is the actual time duration group i took to play hole j, $A(i,j)$ is the actual hole finish clock time group i finishes hole j, $A(i,j-1)$ is the actual hole finish clock time group i finishes hole j−1 (e.g., the previous hole), and $S(i)$ is the actual start clock time group i begins the round (e.g., begins hole 1).

As would be appreciated by one skilled in the art, the hole standard play time can be calculated using a historical average of play times for all players and groups on that hole, using a historical average of play times for a particular player or group on that hole, and/or historical average of play times for players or groups within a predetermined period of time (e.g., daily, weekly, monthly, etc.). The hole adjusted play time can be derived by the system 100 by calculating an adjusted play time that the hole is being played. The hole adjusted play time is calculated by subtracting any derived wait times incurred by players or group from their respective standard play times (e.g., $TT(i,j) T(i,j)-WW(i,j)$). Similarly, the hole adjusted play times can be derived by calculating a historical average of play times for the players and groups for a particular hole.

In accordance with an example embodiment of the present invention, the player/group benchmark play time is derived by the system 100 by calculating an expected time that a player/group should take to play each hole or using the pace ratings. The pace ratings can be determined by industry experts or the course operators themselves. For example, the player/group benchmark can be calculated by taking an average of historical adjusted play times for the particular player/group for that hole. Similarly, the player/group benchmark can be calculated by taking an average of historical adjusted play times for the particular player/group throughout the course and normalized for that particular hole. As would be appreciated by one skilled in the art, the player/group benchmark playtime can be adjusted periodically (e.g., daily, weekly, based on weather, etc.) and calculated a number of other ways known in the art.

The player/group standard play time is a sum play time of all of the holes played by players and groups. The player/group standard play time can be derived by the system 100 by calculating and adding the actual play time that the player/group takes to play each hole. In particular, the player/group standard play time is calculated by calculating a difference between when the player/group enters tee box cage time from the player/group exit green cage time. The player/group adjusted play time can be derived by the system 100 by adjusting the actual play time to account for wait times. The player/group adjusted play time is calculated by subtracting any derived wait times for the player/group from the actual play time of the player/group.

In accordance with an example embodiment of the present invention, the course benchmark play time is derived by the system 100 by calculating a time that the player/group should play the whole course or using benchmarks determined by industry experts or the course operator. For example, the course benchmark can be calculated by taking an average, mean, median, etc. of historical adjusted play times for all players/groups on the course. Similarly, the course benchmark play time can be an average, mean, median, etc. of all the historical adjusted play times for a particular player/group on the course. As would be appreciated by one skilled in the art, the course benchmark playtime can be calculated a number of different ways known in the art.

In accordance with an example embodiment of the present invention, the course standard play time is derived by the system 100 by calculating an actual time that players/groups take to complete the course. As would be appreciated by one skilled in the art, the course standard play time can be calculated using a historical average of play times for all players and groups on that course, using a historical average of play times for a particular player or group on that course, and/or historical average of play times for players or groups within a predetermined period of time (e.g., daily, weekly, monthly, etc.). For example, the course standard play time can be calculated by averaging the standard play time for all players/groups that have completed the course that day or during a specific time of the day (e.g., busy or slow). As would be appreciated by one skilled in the art, the average for the course standard play time may not be calculated until a predetermined number of players/groups have completed the course for a predetermined period of time. For example, the average may not be calculated by the system 100 until at least three players/groups have completed the course that day.

The course adjusted play time can be derived by the system 100 by calculating an adjusted play time the players/groups took to complete the course. In particular, the course adjusted play time is derived by the system 100 by subtracting wait times from the standard play time for the players/groups. As would be appreciated by one skilled in the art, the course adjusted play time can be derived by the system 100 for each particular player/group or a historical average for all players and groups for the particular course. As would be appreciated by one skilled in the art, the various hole play times, the player/group play times, and the course play times may be categorized by predetermined criteria and calculated for all parties satisfying that criteria. For example, the calculated play times for individual players may be calculated separately from the calculated play times for groups.

In accordance with an example embodiment of the present invention, a pace of play metrics for a player/group can be calculated by the system 100 using the data gathered from the events and the derived metrics. When calculating pace of play metrics, for example, the system 100 can use the data gathered related to crossing the cages 402 and/or arcs 406. For example, the pace of play metrics can be calculated by identifying periods in which a player/group is waiting on other player ahead on the course and deducting the wait time from the player/group's overall playtime (e.g., player/group adjusted player time). Additionally, the system 100 can utilize calculated dwell times when calculating the pace of play metrics. As would be appreciated by one skilled in the art, the system 100 can perform various analytics to calculate various other metrics based on player time and location data, as discussed herein. For example, the data gathered from the cages 402 and/or arcs 406 can be used in addition with other data gathered by the data management tool 14 to determine traffic patterns, predictive delays, scheduling tee times, staggering tee times, maintenance schedules, staff dispatching to perform certain tasks within gaps in play, etc.

In accordance with an example embodiment of the present invention, data gathered related to crossing the cages 402 and/or arcs 406 is utilized by the system 100 to determine an adjusted pace of play metric for a player/group. The adjusted pace of play for the player is the difference between the time the player/group takes to play a hole 400 or course while subtracting any time that the player/group was impeded by other players/groups during play (e.g., $TT(i,j)=T(i,j)-WW(i,j)$). In particular, the system 100 calculates a pace of play for each player/group by tracking the total time on the course (e.g., from the first tee to the completion of the eighteenth hole) and subtracting the time spent waiting on other players ahead of the particular player/group to clear the next cages 402 and/or arcs 406. The resulting adjusted pace of play indicates an adjusted play time representing a pace of play if the player/group was not impeded by any other players.

As would be appreciated by one skilled in the art, the system 100 can take into account other factors when determining the adjusted pace of play. For example, the system 100 can adjust the adjusted pace of play for a player/group when they are waving ahead another player/group, such that the waving party's pace of play is not adversely affected by providing the curtesy of waving ahead another party. For example, the system 100 can perform calculations for a player/group adjusted play time to account for the waiting for the following player/group (e.g., waved on player/group) to tee off. An example formula for such a identifying a "wave through" can be written as If $Gin(i+1,j,n)<Gin(i,j,n)$ Then group i "waved through" group i+1, where i is a group number, j is a hole number, n is a cage number, $Gin(i+1,j,n)$ is the clock arrival time group for group i+1 (e.g., the group originally behind group i) at cage n on hole j, and $Gin(i,j,n)$ is the clock arrival time group for group i at cage n on hole j. An example formula for adjusting for a "wave through" can be written as $Gin(i,j,n)-Gout(i+1,j,n-1)$ with group is approximate wait time on the tee being $Gin(i,j,n)-Gin(i+1,j,n-1)$.

Figure 5:
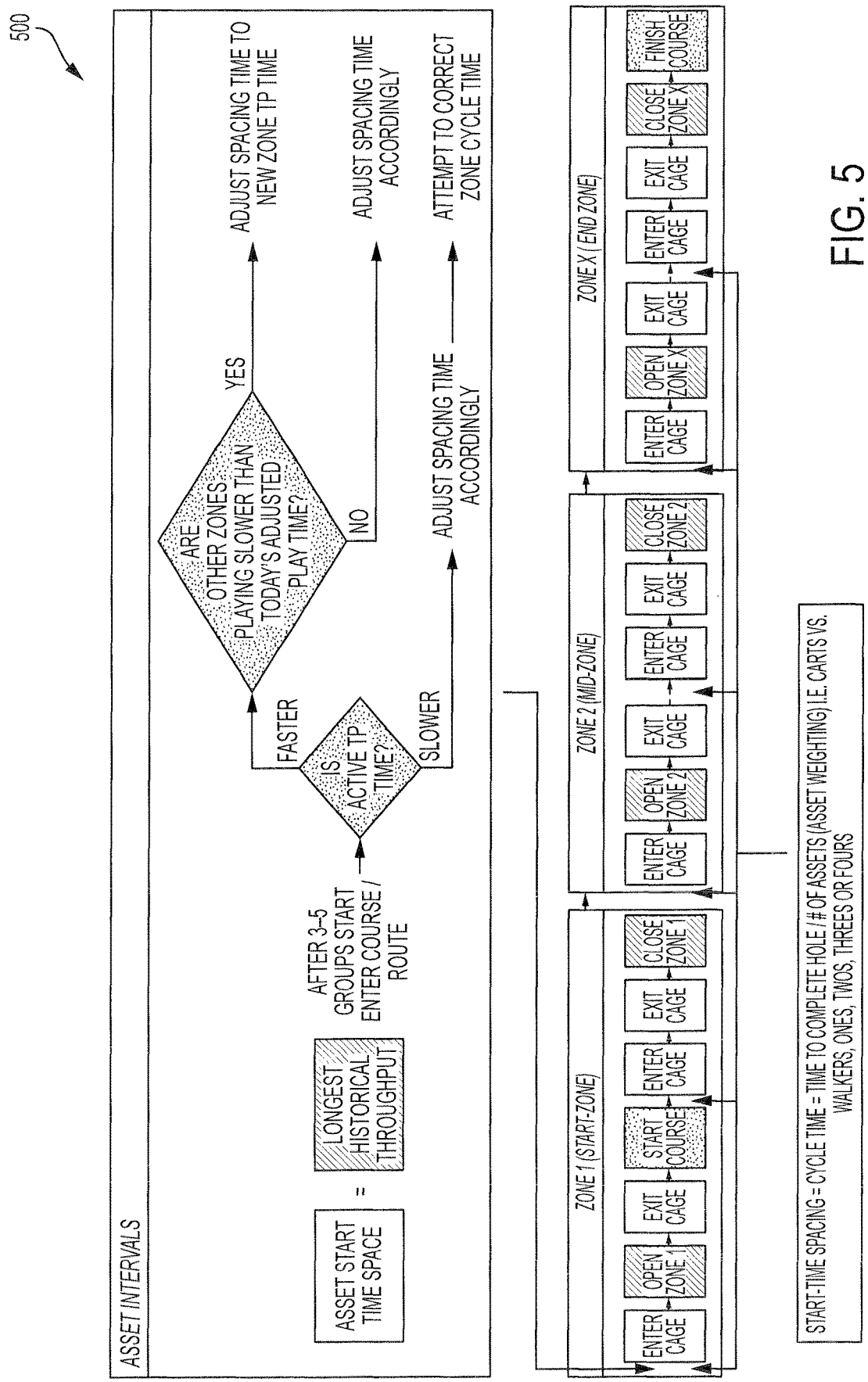
FIG. 5 is an illustrative flowchart depicting operation of the venue management system related to start times, in accordance with aspects of the invention.

Once an adjusted pace of play for a player/group has been established by the system 100, the adjusted pace of play can be utilized at a future point in time for additional analytics related to the golf course. For example, the system 100 can use the adjusted pace of play for players/groups to determine how much space to allocate between tee times (as depicted in FIG. 5), when and where to insert a particular player/group into the course, providing indications to a player/group that they are behind or ahead of the reasonable pace, providing indications that a player/group should wave ahead other players, when/where to perform maintenance, etc. As would be appreciated by one skilled in the art, each implementation can use a combination of unique algorithms designed to improve the overall function of the golf course as well as player experience, as discussed herein.

As would be appreciated by one skilled in the art, there are different algorithms for calculating a pace of play and adjusted pace of play for individual players within a group of players and for solo players. In accordance with an example embodiment of the present invention, the system 100 determines a metric for a plus/minus pace time for individuals in a group of players. The plus/minus pace time is calculated by subtracting a course standard time from the adjusted play time for the group. As would be appreciated by one skilled in the art, the course standard time can be a predetermined value calculated based on specific factors for that course or the course standard time can be calculated using historical data form previously played rounds of golf. In accordance with an example embodiment of the present invention, the system 100 can use the plus/minus pace time to calculate a player pace rating for each individual player in the group. As would be appreciated by one skilled in the art, the player pace rating can be determined using a variety of algorithms using the data gathering devices in the system 100.

For example, each member of a group can be assigned a plus/minus pace time of for each round of golf played by the system 100. The plus/minus pace time for each player can be stored by the system 100 for additional analysis. The system 100 can review the previously stored plus/minus pace times and determine a minimum pace time from the stored the plus/minus pace times. The minimum plus/minus pace time represents the best time that a particular player completed in a round. That minimum plus/minus pace time may not represent the player's absolute pace potential since it was affected by whom the player was grouped with, but it provides the system 100 with an indication of a best plus/minus pace time that player completed a course. As would be appreciated by one skilled in the art, the plus/minus pace time of a player in a group can be slower or faster than the player would have typically played solo or with a different group composition, but the minimum plus/minus pace time provides a metric of the pace of play potential for the player.

Another example methodology for determining a player pace rating for an individual player in a group is to take an average of all the player's recent plus/minus pace times. As would be appreciated by one skilled in the art, the average can be determined using any combination of calculations from the player's historical adjusted pace of play times. For example, the system 100 can calculate the average of the five most recent play times or take an average of the best five adjusted pace of play times out of the last ten play times for the player. The calculated average for the plus/minus pace of play times provides the system 100 with a metric that accounts for unusual circumstances causing especially slow play not the fault of the player. For example, the player may have played on a day in which there was bad weather or there may be instances in which the player is not interested in playing fast and not impeding anyone because there were few groups on the course.

In a third example approach, the system 100 utilizes a statistical regression analysis to determine a player pace rating. As would be appreciated by one skilled in the art, the statistical regression analysis can be performed in any manner sufficient to provide an accurate depiction of a players' pace. For example, the system 100 can calculate each player's player pace rating by "fitting" binary variables to the plus/minus pace times for all rounds played by all players in all groups. The binary variables can include a "0" for when a player is not in the group and a "1" for when the player is in the group for a given round's plus/minus pace time. When the analysis using binary variables is completed by the system 100, each given round's plus/minus pace time is predicted from the player pace rating of the players in the group for that round. The coefficients resulting from the regression would represent each player's player pace rating, each player's contribution to the pace of a group.

Algorithms for Pace of Play Metrics Utilizing Data from the Cages/Arcs

As would be appreciated by one skilled in the art, a variety of algorithms can be utilized by the system 100 in determining various paces of play and player pace rating metrics for players on a golf course. The following exemplary examples of algorithms are not intended to limit the present invention to the golf course illustrative example, but the steps of these algorithms are provided for explanation purposes. The system 100 can utilize the data collected throughout the course (e.g., data related to players crossing cage and/or arc boundaries), as discussed herein, to calculate any number of metrics to be used in any combination of analytics to be presented in any number of formats. In accordance with an example embodiment of the present invention, a combination of live data gathered by the system 100 (e.g., via the one sensor device(s) 10, nation device(s) 20, operator device(s) 18, etc.) and historical data stored thereon can be used to derive the various pace of play metrics discussed herein.

In accordance with an example embodiment of the present invention, each player or group is tracked throughout the golf course utilizing on or more of the sensor device(s) 10, patron device(s) 20, and operator device(s) 18 and data is gathered from those devices reflecting the player(s) or groups location and time at that location and is stored by the system 100. The time and location data is available to the system 100 for calculating the various metrics and performing the various analytics discussed herein. In particular, each player or group has at least one sensor device(s) 10 and/or patron device(s) 20 that is synchronized within the system 100 (e.g., data management tool 14) and is associated with a unique identifier. As would be appreciated by one skilled in the art, the unique identifier can be a fixed identifier associated with a device (e.g., a MAC address) or the unique identifier can be assigned to the device prior to participating in an activity. For example, prior to starting a round of golf on a golf course, the player or group registers the at least one sensor device(s) 10 and/or patron device(s) 20 with the club house (e.g., the operator device(s) 18) and the respective device(s) is assigned a unique identifier. Additionally, the unique identifier can be associated with a particular player or group in the system 100 (e.g., a user profile in the database) such that the tracked data can be associated with the respective party.

In accordance with an example embodiment of the present invention, prior to tee off by the players, the system 100 derives an estimated hole play time for each hole on a course and a course standard play time for the player/group. The tee time, the estimated hole play time, and the course standard play time for the player/group are utilized by the system 100 to further derive hole milestones and hole by hole schedule for the player(s). In particular, the system 100 utilizes the tee time and estimated hole play times to calculate the hole milestones and a hole by hole schedule for each player/group. In accordance with an example embodiment of the present invention, the hole milestone and hole by hole schedule are indicators as to whether the player/group is on schedule for an overall round of golf which can be evaluated at the completion of each hole.

As would be appreciated by one skilled in the art, the estimated hole play times can be user defined values or can be constantly updating based on a historical average of play time data. For user defined estimated hole play times, a user can identify and enter predetermined values of an estimated time to complete each hole on the course into the system 100 (e.g., using an operator device(s) 18 or data management tool 14). For example, user predefined estimates for the estimated hole play times can include eleven minutes for each par three, thirteen minutes for each par four, and seventeen minutes for each par five to create about a four hour round. Similarly, the estimated hole play times can be a historical average of the hole standard play times. For example, the estimated hole play time for each hole on a course can be the hole benchmark play time.

In accordance with an example embodiment of the present invention, the hole milestones and a hole by hole schedule are calculated by adding to the starting clock time of the first tee time (e.g., the clock time when a player first crosses into the first cage 402 or arc 406) to the estimated hole play time for each hole to be played on a course. The holes are assumed to be played incrementally to establish each of the milestones such that each subsequent hole will add an estimated time within the milestones. An example formula for calculating a milestone can be $M(i,j) = S(i) + \text{sum } H(i,j)$ for all $i$ from 1 to $j$, where $i$ is a group number, $j$ is a hole number, $M(i,j)$ is the clock times of hole by hole scheduled milestones for group $i$ to finish hole $j$, $S(i)$ is the actual start clock time group $i$ begins the round, and $H(i,j)$ is the expected hole play time for each group number $i$ for each hole $j$. The hole milestone and the hole by hole schedule define an estimated clock or play time of when the player/group should finish a hole or round of golf to maintain a reasonable pace. As would be appreciated by one skilled in the art, the reasonable pace can be based on a number of different factors. For example, the reasonable pace can vary based on party size (e.g., individual player or group size), a number of holes being played, a level of difficulty of the course/holes being played, and/or a skill level of the player/group.

Once the hole milestone and/or the hole by hole schedule are defined, the system 100 can create a schedule for that player/group. The schedule is established and maintained by the system 100 and is monitored to determine whether the player/group is maintaining the reasonable pace for that player/group according to that schedule. In accordance with an example embodiment of the present invention, the schedule is the clock time of the tee time (e.g., the start of the round of golf) plus the sum of all the holes played up to that point in time. As each hole is completed, the player/group standard play time for that hole is compared, by the system 100, to the derived hole milestone and hole by hole schedule. Based on the comparison, the system 100 can determine whether or not the player/group is "on schedule". To make the "on schedule" determination the system 100 compares a sum of the player/group standard play times for each of the completed holes up to that point in time to the estimated hole play time up to that point in time from the hole milestone and/or the hole by hole schedule. An example formula for such a calculation can be written as $D(i,j)=A(i,j)-M(i,j)$ where i is a group number, j is a hole number, $D(i,j)$ is the difference between milestone and actual finishing time for group I playing hole j, $A(i,j)$ is the actual hole clock finishing time for group i on hole j (e.g., Gout(i,j, Cage Green)), and $M(i,j)$ is the clock times of hole by hole scheduled milestones for group i to finish hole j. If the $D(i,j)$ value is negative or zero, then group i is "on schedule" otherwise group i is not on schedule.

The system 100 can process an "on schedule" algorithm to determine whether or not a player/group is "on schedule" during a round of golf. The "on schedule" algorithm utilizes the hole milestone and/or the hole by hole schedule to establish a total estimated play time value for the play/group at the end of each hole. For example, if the estimated hole play time for the first hole is eleven minutes, the estimated hole play time for the second hole is thirteen minutes, and the estimated hole play time for the third hole is seventeen minutes, then they system has three hole milestones (one for the completion of each hole). The hole milestone and/or the hole by hole schedule for the three holes is eleven minutes for the first milestone (e.g., the estimated time to complete the first hole (11)), twenty-four minutes for the second milestone (e.g., total estimated time for completion of the first hole and the second hole (11+13=24)), and forty-one minutes for the third milestone (e.g., the estimated time for completing all three holes (11+13+17=41).

At each milestone, the "on schedule" algorithm is processed by the system 100. The "on schedule" algorithm adds the player/group standard play time for each hole together and compares the total player/group standard play time to the total estimated milestone play times from the hole milestone and/or the hole by hole schedule. Based on the comparison, the system 100 determines whether or not a player/group is "on schedule". Continuing the example, if the player/group took twenty-six minutes to complete the first and second holes, then the player/group standard play time of twenty-six is compared by the system 100 to the second estimated milestone time of twenty-four minutes. In this example, the group/player is behind schedule because the player/group standard play time is greater than the estimated milestone play time for the first two holes (e.g., 26>24). As would be appreciated by one skilled in the art, if the player/group standard play time is less than or equal to the estimated milestone play time for the first two holes (e.g., <=24) then the player/group would be determined to be "on schedule" by the system 100. As would be appreciated by one skilled in the art, the comparison can be performed using any algorithms known in the art. For example, the comparison can be performed by subtracting the sum of the player/group standard play times for each of the completed holes up to a particular point in time from the estimated hole play time up to that point in time from the hole milestone and/or the hole by hole schedule. If the resulting value is negative then the player/group is "on schedule", otherwise if the resulting value is positive then the player/group is not "on schedule". As would be appreciated by one skilled in the art, the same calculations can be performed using the player/group adjusted play times in place of the player/group standard play times to account for impeding wait times caused by other players.

In accordance with an example embodiment of the present invention, the system 100 can calculate a value for any deviation from the schedule or deviation value. The deviation value can be calculated by taking the difference between the player/group standard play times and the hole milestone and/or the hole by hole schedule. The difference is the deviation value. As would be appreciated by one skilled in the art, the same calculations can be performed using the player/group adjusted play times in place of the player/group standard play times to account for impeding wait times caused by other players. In accordance with an example embodiment of the present invention, the system 100 can utilize the deviation value to determine if a player/group is being impeded by other players/groups. An example formula for such a calculation for the deviation value can be written as $D(i-1,j)$: This deviation value identifies the time difference for the group ahead for hole j (the hole that group i just finished). If the deviation value is negative or zero, then group i has not been impeded by the group ahead, however, if the deviation value is positive, then group i may have been impeded. When the system 100 identifies that a particular player/group is bring impeded by identifying that a group immediately ahead of that particular player/group is off schedule and the other player/group does not play a hole within the hole standard play time (e.g., is off pace or off schedule). In this circumstance, the system 100 labels the particular player/group as "impeded". Similarly, when the system 100 identifies that a player/group incurs waiting time on a hole and the player/group does not play a hole within the hole standard play time, the system 100 labels the player/group as "alternate impeded".

In accordance with an example embodiment of the present invention, the system 100 can utilize the deviation value to determine if a player/group is impeding other players/groups. An example formula for such a calculation for the deviation value can be written as $A(i-1,j)-A(I,j)<H(j)$ to indicate if group i-1 is not more ahead of Group i than the hole's hole play time, and thus group i-1 is impeding group i (i.e. group i is impeded by the group ahead). Where i is a group number, j is a hole number, $A(i-1,j)$ is the actual hole finish clock time group i-1 finishes hole j, $A(i,j)$ is the actual hole finish clock time group i finishes hole j, and $H(i)$ is the expected hole play time for hole j. When the system 100 identifies that a player/group behind a particular player/group is off pace or off schedule and not further behind than the hole standard play time, in this circumstance, the system 100 labels the particular player/group as "impeding". Similarly, when the system 100 identifies that a player/group behind the particular player/group incurs waiting time on a hole and the player/group does not play a hole within the hole standard play time, the system 100 labels the player/group as "alternate impeding". As would be appreciated by one skilled in the art, the impeded and impeding labels can be used by the system 100 to derive additional metrics and/or be provided to users and/or players to indicate which parties are impeded and impeding others.

In accordance with an example embodiment of the present invention, a pace of play algorithm can be used to determine whether a player/group is "on pace". The on pace algorithm can operate similarly to the "on schedule" algorithm. In particular, the system 100 processes the "on pace" algorithm to evaluate player/group play times compared to estimated play times on a hole by hole basis. The "on pace" algorithm compares the player/group standard play time for a particular hole to the estimated hole play time for that particular hole. Based on the comparison, the system 100 can determine whether or not a player/group is "on pace". An example formula for an on pace algorithm can be written as T(i,j): If less than or equal to H(j), Then group i is "on pace" otherwise group i is not on pace, where i is a group number, j is a hole number, T(i,j) is the actual time duration group i took to play hole j (e.g., TT(i,j)), and H(i) is the expected hole play time for hole j.

For example, if the player/group standard play time for hole one is ten minutes and the estimated hole play time for hole one is eleven minutes, then the system 100 uses the "on pace" algorithm perform the comparison to determine that the player/group is "on pace" (e.g., 10<11). Similarly, if the player/group standard play time for hole one is fourteen minutes instead, then the "on pace" algorithm is utilized by the system 100 to determine that the player/group is not "on pace" because fourteen minutes is greater than the estimate hole play time of eleven for that particular hole. As would be appreciated by one skilled in the art, the same calculations can be performed using the player/group adjusted play times in place of the player/group standard play times to account for impeding wait times caused by other players. Similarly, all of the calculations discussed herein can include a margin of acceptance. For example, the margin of acceptance can be one minute, such that if D(i,j) is less than one minute, then group i is still considered, by the system 100, to be "on schedule."

In accordance with an example embodiment of the present invention, the result of the on pace algorithm can be relayed to the player/group. In particular, the on pace indicator can be transmitted to the patron device 20 or sensor device 10 being carried by the player/group for notification on the LED and/or e-Ink display. For example, the LED and/or e-Ink display can display a green card or color to indicate that the player/group is playing at the proper pace, a yellow card or color to indicate that the player/group is not on schedule but is impeded by a player/group ahead, or a red card or color to indicate that the player/group is playing slowly and causing others to play slowly.

As would be appreciated by one skilled in the art, the system 100 can combine various metrics to determine what pace of play/on schedule colors to indicate to the players/groups. The colors notify the player/group whether their pace of play is good (e.g., green) or whether they need to pick up the pace (e.g., yellow or red). In accordance with an example embodiment of the present invention, the system 100 can combine metrics related to "on schedule", "on pace", impeded, and impeding. With this particular combination of metrics, there are sixteen possible combinations, each with two indicators (e.g., Y or N); on or off schedule, on or off pace, impeded or not, and impeding or not. The possible combinations are depicted in Table 1.

TABLE 1

| | On Schedule | On Pace | Impeded | Impeding | Color |
|---|---|---|---|---|---|
| 1. | Y | Y | Y | Y | Green |
| 2. | Y | Y | Y | N | Green |
| 3. | Y | Y | N | Y | Green |
| 4. | Y | Y | N | N | Green |
| 5. | Y | N | Y | Y | Green |
| 6. | Y | N | Y | N | Green |
| 7. | Y | N | N | Y | Yellow |
| 8. | Y | N | N | N | Green |
| 9. | N | Y | Y | Y | Yellow |
| 10. | N | Y | Y | N | Green |
| 11. | N | Y | N | Y | Red |
| 12. | N | Y | N | N | Green |
| 13. | N | N | Y | Y | Yellow |
| 14. | N | N | Y | N | Yellow |
| 15. | N | N | N | Y | Red |
| 16. | N | N | N | N | Yellow |

The system 100 can use the information in this table to determine what color indicator to transmit to a player/group's respective devices (e.g., patron device(s) 20, sensor device(s) 10, etc.). For example, as depicted in the first line of Table 1, if the system determines that the player/group is on schedule, the player/group has played the hole "on pace", that the player/group is being impeded by a player/group ahead, and that the player/group is impeding a player/group behind then the displayed color or card will be green. As would be appreciated by one skilled in the art, each result in each column is calculated and/or derived by the system based on a combination of the algorithms discussed herein. An example formula for such a calculation can be written as if D(i,j)<=0 (e.g., on schedule) AND TT(i,j)<=H(i,j) (e.g., on pace) AND WW(i,j)=either + or − (e.g., whether or not incurred waiting/impeded) AND WW(i+1,j)=either + or − (e.g., whether or not causing waiting/impeding), Then green card. The system 100 can utilize a lookup table stored in a database to determine the color card to display based on the derived values from the "on pace", "on schedule", impeded, and impeding algorithms. Similarly, the system 100 can have an algorithm tailored to compare these values without the use of a lookup table. Additionally, the card color can be determined using any other methodologies utilizing the combination of hardware, software, and data collected within the system 100, known in the art.

Figure 6:
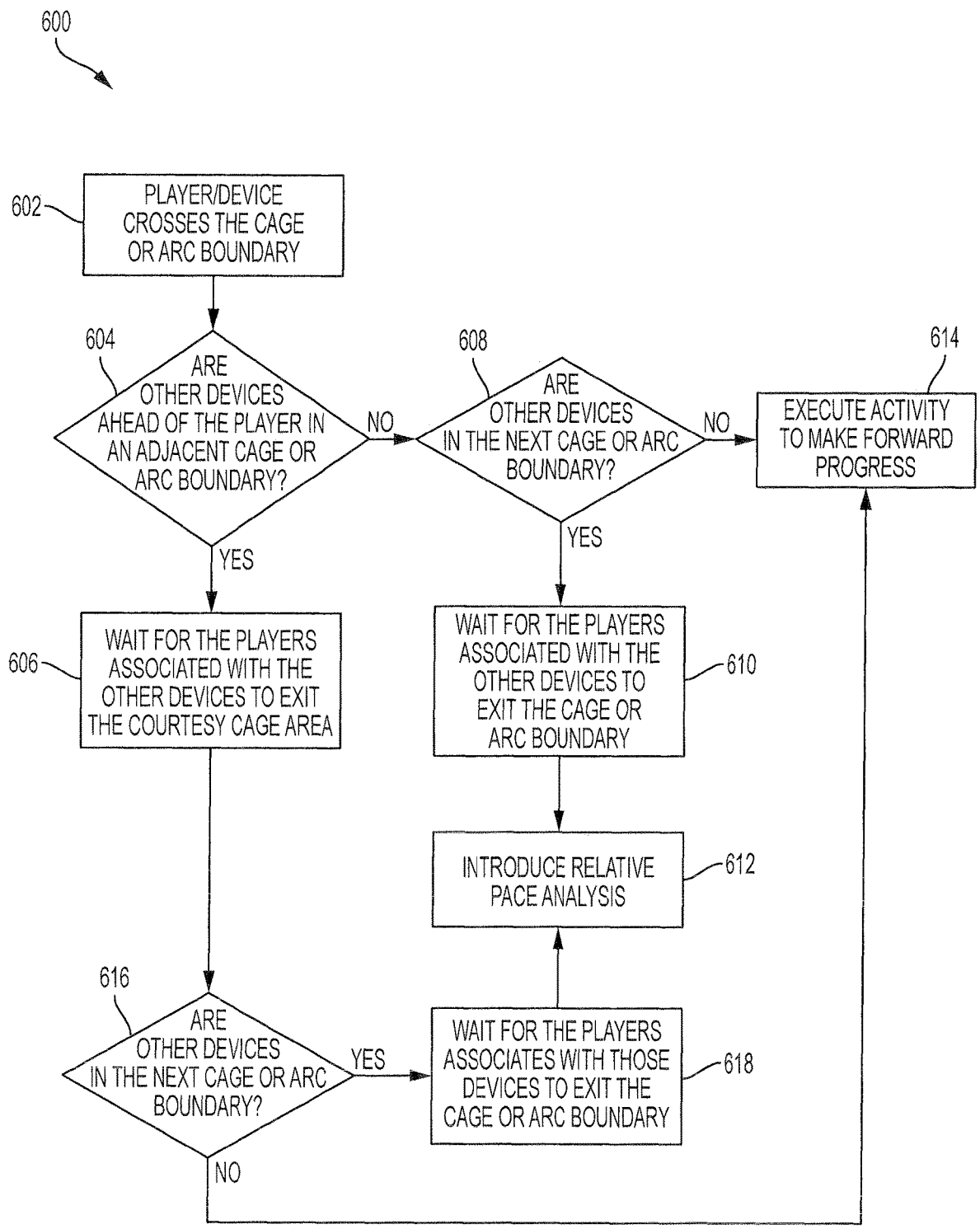
FIG. 6 is an illustrative flowchart depicting operation of the venue management system related to pace of play, in accordance with aspects of the invention.
Figure 7:
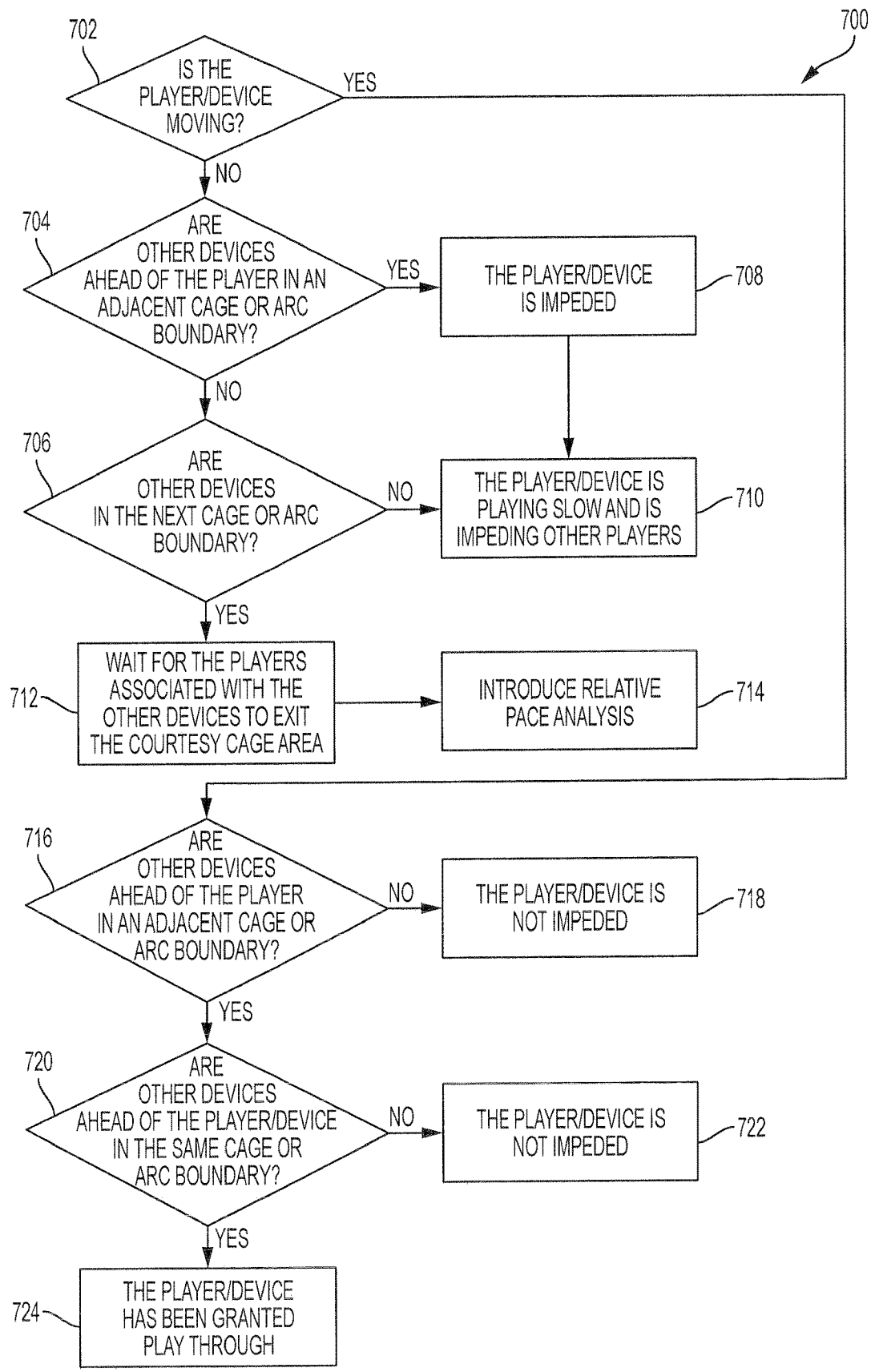
FIG. 7 is an illustrative flowchart depicting operation of the venue management system related to pace of play, in accordance with aspects of the invention.

FIGS. 5-7 show exemplary flow charts depicting implementation of the present invention. In particular, FIG. 5 depicts a method 500 to calculate the suggested scheduling of spacing between groups of players starting a round of golf on the golf course. The spacing is based upon the longest throughput (tp) of any hole played during a current active round. In accordance with an example embodiment of the present invention, the system 100 only includes holes that have had five players or groups play those holes today. For example, if hole number seventeen has been played in eighteen minutes by a particular player or group and the eighteen minutes is the longest time of any active throughput for a player or group on holes seventeen that day, then the system 100 adjusts the tee time spacing from the predetermined spacing (e.g., 14 minutes) to eighteen minutes to account for the lengthier playtime throughput. Accordingly, the tee time will be adjusted to match the throughput of players or groups playing the hole(s) a specific period of time during that day. As would be appreciated by one skilled in the art, the tee time spacing can also be adjusted to be a shorter period of time. For example, once the longest throughput on a hole is sixteen minutes for the last five players or groups on a hole, then the spacing becomes sixteen minutes instead of the eighteen minutes and the time can be adjusted dynamically to reflect the current throughput.

Continuing with FIG. 5, in accordance with an example embodiment of the present invention, the system 100 waits until a predetermined number of groups (e.g., 3-5) has started playing golf in order to begin recommending an appropriate real-time group spacing time. If the course has not seen the predetermined number of groups play yet, then the tee times can be based on a historical average and then adjust accordingly until the predetermined number of groups is met. Additionally, the system 100 can utilize zones to track the tee times. Zone 1, as depicted in FIG. 5, represents the method 500 for how the system 100 tracks a start of a "round of golf". In particular, the system 100 tracks the start by marking the time clock starts for a round of golf when an asset enters the first tee box cage 402a, thus opening up Zone 1. As would be appreciated by one skilled in the art, Zone 1 does not need to be correlated to the first hole necessarily but can be any hole that they golfer has been placed to start a round of golf. Zone X, or the end zone, represents the last hole in a round of gold and the system 100 ends the total clock time for the round of golf. The individual zone cycle times are calculated by detecting a golfer entering a tee box cage 402a, which opens the zone, and entering the green cage 402b which then closes the zone and the system 100 calculates the total throughput time. The longest current throughput time is used to determine asset start time space or tee time spacing between golfers/groups. As would be appreciated by one skilled in the art, the throughput is fluid throughout the day and can be adjusted based on size of group (singles vs twosome vs threesome vs. foursome, etc.) and whether they are walking, riding or have a caddie.

FIG. 6 depicts a process 600 that the system 100 uses to calculate the on pace algorithm, as discussed herein. At step 602, the system 100 identifies that a particular device carried by a particular player (e.g., sensor device 10, operator device 18, and patron device 20) crosses cage 402 or arc 406 boundary. For example, the system 100 periodically pings the particular device and determines that the particular device has crossed an area defined by a geolocation boundary for a particular cage 402 or arc 406, as discussed herein. At step 604, the system 100 determines whether there are other devices, being carried by other players, are located ahead of the particular player/device. For example, the system 100 determines whether there are other players, carrying devices detectable by the system 100, located at an area (e.g., an adjacent cage 402 or arc 406) immediately ahead of the particular player.

If at step 604, the system 100 does detect other devices immediately ahead of the particular player/device then the process 600 advances to step 606. If at step 604, the system does not detect other devices immediately ahead of the particular player/device then the process 600 advances to step 608. At step 608, the system 100 determines whether there are other devices, being carried by other players, located in the next cage 402 or arc 406 (e.g., the next adjacent cage 402 or arc 406 on a hole or the course) from the particular player/device. If at step 608, the system 100 does detect other devices in the next cage 402 or arc 406 from the particular player/device then the process 600 advances to step 610. At step 610, the system 100 instructs the particular player (e.g., via E-Ink or patron device 20 display) to wait for the other players to exit the next cage 402 or arc 406 and advances to step 612. At step 612, the system introduces the relative pace analysis to the particular player's device. The relative pace analysis is the adjusted player/group pace (e.g., adjusted by wait time) to be displayed to the player or group. If at step 608, the system does not detect other devices next cage 402 or arc 406, then the process 600 advances to step 614. At step 614, the system 100 executes activity to make forward progress. Executing activity to make forward progress indicates to the player or group that if there is no player or group occupying the area in front of them then they should be making forward progress. Thereafter, the player or group should be moving forward or they might start to impede players behind them. Any time the player or group takes to complete a hole (without anyone in front of them in a cage 402 or courtesy arc 406) is "charged" to them as impeding if they are holding up other players.

Returning to step 604, if the system 100 does detect other devices immediately ahead of the particular player/device then the process 600 advances to step 606. At step 606, the system 100 instructs the particular player to wait for the other players to exit the area immediately ahead to exit and advances to step 616. At step 616, the system 100 determines whether there are other devices, being carried by other players, located in the next cage 402 or arc 406 from the particular player/device. If at step 616, the system 100 does detect other devices in the next cage 402 or arc 406 from the particular player/device then the process 600 advances to step 618. At step 618, the system 100 instructs the particular player to wait for the other players to exit the next cage 402 or arc 406 and advances to step 612. At step 612, the system introduces the relative pace analysis to the particular player's device. If at step 616, the system does not detect other devices next cage 402 or arc 406, then the process 600 advances to step 614. At step 614, the system 100 executes activity to make forward progress.

FIG. 7 depicts a process 700 for tracking player movement and calculating metrics for the player based on the data gathered on a golf course. At step 702, the system determines whether a particular player/device (e.g., sensor device 10, operator device 18, patron device 20) being carried by the player is moving. If the system determines that the player/device is not moving, the process 700 advances to step 704. Otherwise if the system determines that the player/device is moving, the process 700 advances to step 716. At step 704, the system 100 determines whether there are other devices, being carried by other players, are located ahead of the particular player/device. The process at step 704 is similar to the process in steps 604, as discussed with respect to FIG. 6. If, at step 704, the system 100 does detect other devices immediately ahead of the particular player/device then the process 700 advances to step 708. At step 708, the system 100 determines that the particular player/device is impeded. If at step 704, the system does not detect other devices immediately ahead of the particular player/device then the process 700 advances to step 706.

At step 706, the system 100 determines whether there are other devices, being carried by other players, located in the next cage 402 or arc 406 from the particular player/device. If at step 706, the system 100 does not detect other devices in the next cage 402 or arc 406 from the particular player/device then the process 700 advances to step 710. At step 710, the system 100 instructs the particular player that they are playing slow and impeding other players and advances to step 714. At step 714, the system introduces the relative pace analysis to the particular player's device. If at step 706, the system does detect other devices next cage 402 or arc 406, then the process 700 advances to step 712. At step 712, the system 100 instructs the particular player to wait for the other players to exit the area immediately ahead to exit the area. Once the system 100 determines that the other players to exit the area immediately ahead, the process advances to step 714. At step 714, the system introduces the relative pace analysis to the particular player's device. The process at step 714 is similar to the process in steps 612, as discussed with respect to FIG. 6.

At step 716, the system 100 determines whether there are other devices (e.g., sensor device 10, operator device 18, patron device 20), being carried by other players, are located ahead of the particular player/device. The process at step 716 is similar to the process in steps 604, as discussed with respect to FIG. 6. If at step 716, the system does not detect other devices immediately ahead of the particular player/device then the process 700 advances to step 718. At step 718, the system 100 determines that the particular player/device is not impeded. If at step 716, the system 100 does detect other devices immediately ahead of the particular player/device then the process 700 advances to step 720. At step 720, the system determines whether other devices ahead of the player/device in the same cage 402 or arc 406 boundary. If the system 100 determines that there are no other devices ahead of the player/device in the same cage 402 or arc 406 boundary, then the process advances to step 722. At step 722, the system 100 determines that the particular player/device is not impeded. If the system 100 determines that there are other devices ahead of the player/device in the same cage or arc boundary, then the process advances to step 724. At step 724, the system 100 sends notifications to the other players/devices to let the particular player/device play through.

As would be appreciated by one skilled in the art, all of the tracking, data aggregation, calculations, determinations, derivations, etc. are necessarily performed by the combination of hardware and software embodied in the system 100, as described herein. The system 100 provides the necessary hardware and software installed thereon to efficiently and expeditiously process the various algorithms discussed herein. Such processes provide an improvement to data analytics systems which are necessarily rooted in computer technologies.

Figure 8:
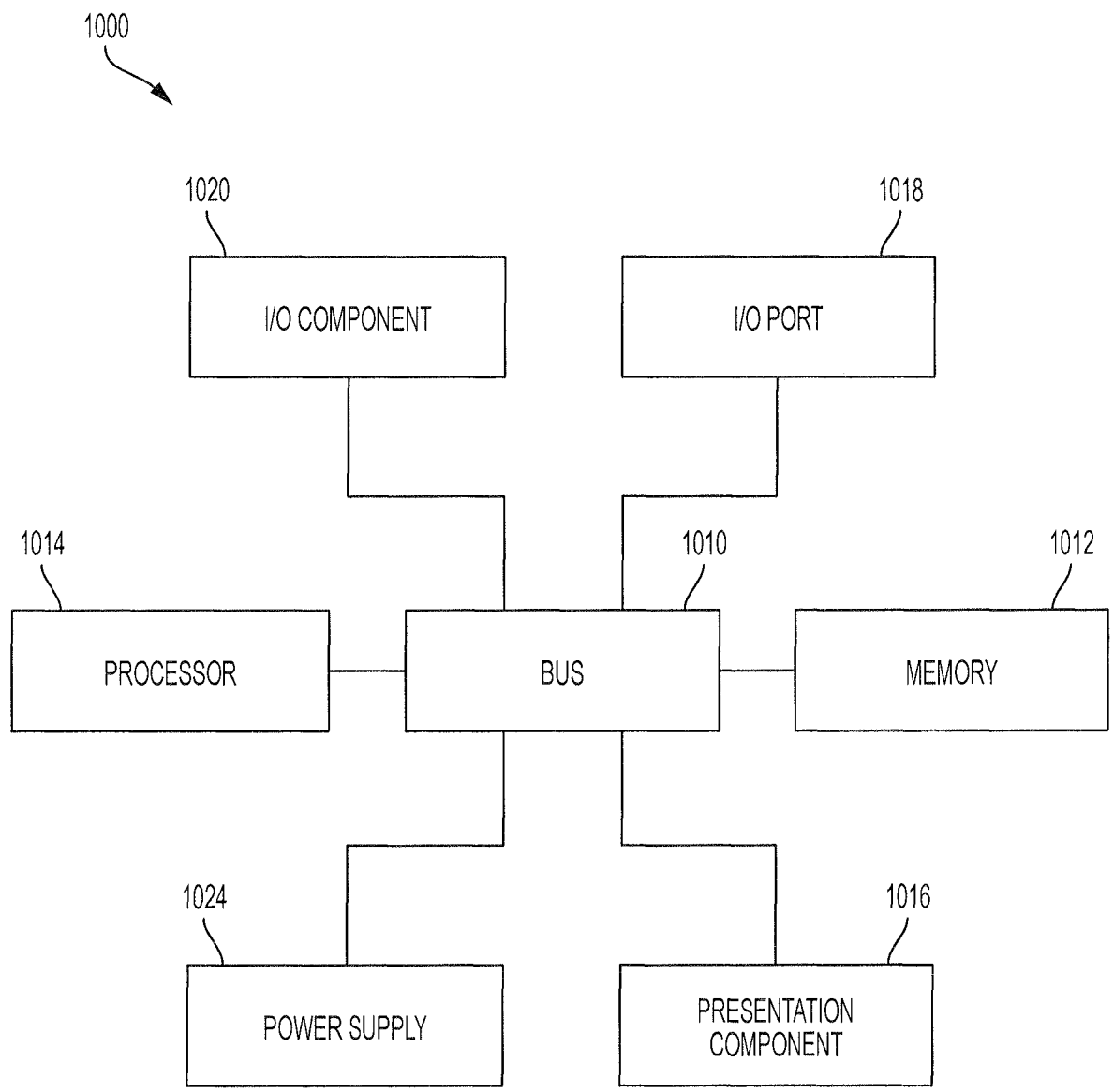
FIG. 8 is a diagrammatic illustration of a high level architecture configured for implementing processes in accordance with aspects of the invention.

Any suitable hardware device can be used to implement the various sensor and computing devices 10, 12, 14, 16, 18, 20 and methods/functionality described herein and be converted to a specific system for performing the operations and features described herein through modification of hardware, software, and firmware, in a manner significantly more than mere execution of software on a generic computing device, as would be appreciated by those of skill in the art. One illustrative example of such a computing device 1000 is depicted in FIG. 8. The computing device 1000 is merely an illustrative example of a suitable computing environment and in no way limits the scope of the present invention. A "computing device," as represented by FIG. 8, can include a "workstation," a "server," a "laptop," a "desktop," a "hand-held device," a "mobile device," a "tablet computer," or other computing devices, as would be understood by those of skill in the art. Given that the computing device 1000 is depicted for illustrative purposes, embodiments of the present invention may utilize any number of computing devices 1000 in any number of different ways to implement a single embodiment of the present invention. Accordingly, embodiments of the present invention are not limited to a single computing device 1000, as would be appreciated by one with skill in the art, nor are they limited to a single type of implementation or configuration of the example computing device 1000.

The computing device 1000 can include a bus 1010 that can be coupled to one or more of the following illustrative components, directly or indirectly: a memory 1012, one or more processors 1014, one or more presentation components 1016, input/output ports 1018, input/output components 1020, and a power supply 1024. One of skill in the art will appreciate that the bus 1010 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, FIG. 8 is merely illustrative of an exemplary computing device that can be used to implement one or more embodiments of the present invention, and in no way limits the invention.

The computing device 1000 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices that can be used to encode information and can be accessed by the computing device 1000.

The memory 1012 can include computer-storage media in the form of volatile and/or nonvolatile memory. The memory 1012 may be removable, non-removable, or any combination thereof. Exemplary hardware devices are devices such as hard drives, solid-state memory, optical-disc drives, and the like. The computing device 1000 can include one or more processors that read data from components such as the memory 1012, the various I/O components 1016, etc. Presentation component(s) 1016 present data indications to a user or other device. Exemplary presentation components include a display device, speaker, printing component, vibrating component, etc.

The I/O ports 1018 can enable the computing device 1000 to be logically coupled to other devices, such as I/O components 1020. Some of the I/O components 1020 can be built into the computing device 1000. Examples of such I/O components 1020 include a microphone, joystick, recording device, game pad, satellite dish, scanner, printer, wireless device, networking device, and the like.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about" and "approximately" are intended to cover variations that may existing in the upper and lower limits of the ranges of subjective or objective values, such as variations in properties, parameters, sizes, and dimensions. In one non-limiting example, the terms "about" and "approximately" mean at, or plus 10 percent or less, or minus 10 percent or less. In one non-limiting example, the terms "about" and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A system for tracking and managing a plurality of patrons of an activity venue, the activity venue including a plurality of sub-activities in which patrons participate, the system comprising:

each sub-activity of the plurality of sub-activities having a point of access for the plurality of patrons to embark on the sub-activity, wherein the point of access is recognized by the system using a plurality of unlinked sensor devices comprising one or more venue asset devices or one or more venue asset tags, each configured to communicate with a wireless gateway and provide real-time location data for the one or more venue asset devices or one or more venue asset tags that are unassociated with any patron devices;

a plurality of patron sensor devices for disposition and transportation throughout the activity venue by the plurality of patrons, each of the plurality of patron sensor devices comprising a location sensor configured to provide real-time location data indicating the location of the plurality of patron sensor devices within the activity venue and a wireless communication device for communication with the wireless gateway, the communication comprising receiving the real-time location data from the plurality of patron sensor devices, wherein arcs covering predefined areas and/or boundaries, comprising a predetermined distance radius from a point of interest, define locations for two or more virtual cages further defined by geolocation boundaries setup using unlinked sensor devices, where the virtual cages and/or arcs are utilized in combination to gather data for the system to track and record events and derive metrics related to the virtual cages and arcs, tracked events including when a patron or group of patrons enters, crosses or exits a boundary defined by one or more of the two or more virtual cages and/or arcs and where and when a patron or group of patrons is located in relation to other patrons, enabling the system to establish a real-time location of each of the plurality of patron sensor devices within the activity venue, track how long a group of patrons spends in a particular virtual cage and/or arc and derive a dwell time wherein the system stores a first crossing reading as a minimum crossing time and then a subsequent crossing time is stored as a maximum crossing time with each new crossing time replacing previously stored maximum crossing times, then the system subtracts a minimum crossing time from a maximum crossing time to derive the dwell time as $L(i,k,j,n)=Pmax(i,k,j,n)-Pmin(i,k,j,n)$, where i is a group number, k is a patron number in group i, j is a hole number, n is a virtual cage number on the hole j, $L(i,k,j,n)$ is the dwell time at virtual cage n on hole j for group i, $Pmax(i,k,j,n)$ is the final crossing clock time for patron k in group i, on hole j for exiting virtual cage n, and $Pmin(i,k,j,n)$ is the first crossing clock time for patron k in group i, on hole j for entering virtual cage n; and a computing device in communication with the wireless gateway, the computing device executing a tracking tool that receives the real-time location data for each of the plurality of patron sensor devices, the plurality of unlinked sensor devices, and the virtual cages and/or arcs via the wireless gateway and analyzes collected real-time location data, time data, and other information, then transforms the real-time location data into predictive data indicating anticipated locations of each of the plurality of patron sensor devices within the virtual cages of the activity venue at future times.

2. The system of claim 1, wherein the activity venue is a golf course, the plurality of sub-activities are holes on the golf course, and the plurality of patrons are golfers on the golf course.

3. The system of claim 1, wherein the computing device provides information related to at least one of: sub-activity time management, participant matching, live traffic control, statistics related to the tracked movements of the plurality of patrons, predictive analytics of the plurality of patrons, layout of the activity venue, and maintenance of the activity venue to at least an operator of the activity venue.

4. The system of claim 1, wherein the computing device analyzes the collected location data, time data, and other information and then provides information related to at least one of: pace of play for the each sub-activities, sub-activity start times, statistics, instructions and/or feedback information and weather to one or more of the plurality of patron sensor devices, the plurality of unlinked sensor devices, or a plurality of operator devices, within the activity venue, wherein crossing of a boundary of an arc or a virtual cage of the two or more virtual cages is tracked by recording a location of a patron or group of patrons at a particular point in time by periodically pinging a linked patron sensor device, where after each ping, the system determines whether the patron or group of patrons are located within or outside that virtual cage or arc and records location and a clock time when a patron or group of patrons first identified as being located in that virtual cage and/or arc and a clock time when that patron or group of patrons leaves that virtual cage and/or arc after recording a ping inside that virtual cage and/or arc.

5. The system of claim 1, wherein the plurality of patron sensor devices each comprise a light-emitting diode (LED), the LED configured to change color based on an actual pace of a patron carrying the plurality of patron sensor devices relative to another patron or group of patrons carrying one or more of the plurality of patron sensor devices ahead of the patron and a target pace for the patron.

6. The system of claim 1, wherein the plurality of patron sensor devices each comprise an electronic ink (e-Ink) display, the e-Ink display configured to display a distance to another one of the plurality of patron sensor devices or distance to a venue asset tag.

7. The system of claim 6, wherein the displayed distance is a distance to a pin with the venue asset tag located on a current hole on a golf course.

8. The system of claim 1, wherein the plurality of patron sensor devices each comprise a payment method stored on the plurality of patron sensor devices.

9. The system of claim 1, wherein the plurality of patron sensor devices each comprise a motion sensor, and when the motion sensor for a patron sensor device does not detect motion for a predefined period of time, the patron sensor device enters a low power state, and upon a detection of motion, the patron sensor device is woken from the low power state.

10. The system of claim 1, wherein each of the plurality of patron sensor devices are at least one of a golf bag tag, a key chain, a card, a club grip, and a ball mark repair tool, and the plurality of unlinked sensor devices comprising venue asset devices or venue asset tags are attached to an object associated with the activity venue.

11. The system of claim 10, wherein a venue asset tag of the one or more venue asset tags is in local communication with at least one patron sensor device of the plurality of patron sensor devices and enables calculation of a distance between the venue asset tag and the at least one patron sensor device without use of an intermediary device.

12. The system of claim 1, wherein the wireless gateway comprises a long range wide area network (LoRa) gateway.

13. The system of claim 1, wherein the one or more venue asset devices or one or more venue asset tags are attachable to or integrated into at least one of a flag stick, a golf cart, a piece of maintenance equipment, a maintenance vehicle, a yardage marker, sprinkler heads, and a sign.

14. The system of claim 13, wherein the one or more venue asset tags attached to or integrated into the sprinkler heads are configured to monitor an operating state of the sprinkler heads and turn on and off the sprinkler heads in response to receiving instructions from the computing device.

15. The system of claim 13, wherein:
the one or more venue asset tags attached to or integrated into the maintenance vehicle are configured to detect vibration of the maintenance vehicle during operation and transmit a duration of operation to the computing device; and
the computing device optimizes a maintenance schedule for the maintenance vehicle based on the duration of operation.

16. The system of claim 1, wherein the computing device is a cloud based computing device infrastructure.

17. The system of claim 1, wherein the system identifies predictive gaps in usage of each sub-activity based on the location data for each of the plurality of patron sensor devices, and the system issues notifications of recommended points of access for sub-activities at future times having the identified predictive gaps in usage in such a way that maximizes a number of the plurality of patrons engaging in each sub-activity of the plurality of sub-activities and minimizes a number of the plurality of patrons waiting to engage in usage of each sub-activity due to the sub-activity being utilized by other of the plurality of patrons.

18. A system for managing maintenance tasks within an activity venue, the activity venue including a plurality of sub-activities in which patrons participate, the system comprising:
a wireless gateway comprising a long range wide area network (LoRa) gateway;
a plurality of patron sensor devices for disposition and transportation throughout the activity venue by a plurality of patrons, each of the plurality of patron sensor devices comprising:
a location sensor configured to provide real-time location and time data indicating the location of the plurality of patron sensor devices at different points in time within the activity venue; and
a wireless communication device for communication with the wireless gateway, the communication comprising transmitting the real-time location and time data from the plurality of patron sensor devices to the wireless gateway, wherein arcs covering predefined areas and/or boundaries, comprising a predetermined distance radius from a point of interest, define locations for two or more virtual cages further defined by geolocation boundaries setup using unlinked sensor devices and the virtual cages and/or arcs are utilized in combination to gather data for the system to track and record events and derive metrics related to the virtual cages and arcs, tracked events including when a patron or group of patrons enters, crosses or exits a boundary defined by one or more of the two or more virtual cages and/or arcs and where and when a patron or group of patrons is located in relation to other patrons, enabling the system to establish a real-time location of each of the plurality of patron sensor devices within the virtual cages of the activity venue, track how long a group of patrons spends in a particular virtual cage and/or arc and derive a dwell time wherein the system stores a first crossing reading as a minimum crossing time and then a subsequent crossing time is stored as a maximum crossing time with each new crossing time replacing previously stored maximum crossing times, then the system subtracts a minimum crossing time from a maximum crossing time to derive the dwell time as $L(i,k,j,n)=Pmax(i,k,j,n)-Pmin(i,k,j,n)$, where i is a group number, k is a patron number in group i, j is a hole number, n is a virtual cage number on the hole j, $L(i,k,j,n)$ is the dwell time at virtual cage n on hole j for group i, $Pmax(i,k,j,n)$ is the final crossing clock time for patron k in group i, on hole j for exiting virtual cage n, and $Pmin(i,k,j,n)$ is the first crossing clock time for patron k in group i, on hole j for entering virtual cage n;
a computing device in communication with the wireless gateway, using a plurality of unlinked sensor devices comprising one or more venue asset devices or one or more venue asset tags, each configured to communicate with the wireless gateway and provide real-time location data for the one or more venue asset devices or one or more venue asset tags that are unassociated with any patron devices, the computing device executing a tracking tool that receives the real-time location and time data for each of the plurality of patron sensor devices, the plurality of unlinked sensor devices, and the virtual cages and/or arcs via the wireless gateway and analyzes collected real-time location data, time data, and other information, then transforms the real-time location and time data into predictive data indicating anticipated locations of each of the plurality of patron sensor devices within the virtual cages of the activity venue at future times; and wherein the system identifies predictive gaps in usage of each sub-activity of the plurality of sub-activities based on the location and time data for each of the plurality of patron sensor devices.

19. The system of claim 18, where the system issues notifications to one or more operator devices and/or sensors devices associated with staff members, recommending types of maintenance tasks to be performed during the predictive gaps in usage.

20. The system of claim 18, wherein one or more venue asset tags configured to communicate with the wireless gateway and provide real-time location and time data for the one or more venue asset tags that are attachable to or integrated into at least one of a flag stick, a golf cart, a piece of maintenance equipment, a maintenance vehicle, a yardage marker, sprinkler heads, and a sign.

21. The system of claim 20, wherein the one or more venue asset tags are attached to at least one of a flag stick, a piece of maintenance equipment, a maintenance vehicle, a yardage marker, sprinkler heads, and a sign.

22. The system of claim 21, wherein the one or more venue asset tags attached to or integrated into the sprinkler heads are configured to monitor an operating state of the sprinkler heads and turn on and off the sprinkler heads in response to receiving instructions from the computing device.

23. The system of claim 21, wherein:
the one or more venue asset tags attached to or integrated into the maintenance vehicle are configured to detect vibration of the maintenance vehicle during operation and transmit a duration of operation to the computing device; and
the computing device optimizes a maintenance schedule for the maintenance vehicle based on the duration of operation.

24. The system of claim 18, wherein the computing device provides information related to at least one of: sub-activity time management, participant matching, live traffic control, statistics related to the tracked movements of the plurality of patrons, predictive analytics of the plurality of patrons, layout of the activity venue, and maintenance of the activity venue to at least an operator of the activity venue.

25. The system of claim 18, wherein the computing device provides information related to at least one of: pace of play for the each sub-activities, sub-activity start times, statistics, and weather to the plurality of patrons of the plurality of patron sensor devices within the activity venue.

26. The system of claim 18, wherein the plurality of patron sensor devices each comprise an electronic ink (e-Ink) display, the e-Ink display configured to display a distance to another one of the plurality of patron sensor devices or distance to a venue asset tag.

27. The system of claim 18, wherein the plurality of patron sensor devices each comprise a motion sensor, and when the motion sensor for a patron sensor device does not detect motion for a predefined period of time, the patron sensor device enters a low power state, and upon a detection of motion, the patron sensor device is woken from the low power state.

28. The system of claim 18, wherein each of the plurality of patron sensor devices can be at least one of a golf bag tag, a key chain, a card, a club grip, and a ball mark repair tool.

29. The system of claim 18, wherein a venue asset tag is in local communication with at least one patron sensor device of the plurality of patron sensor devices and enables calculation of a distance between the venue asset tag and the at least one patron sensor device without use of an intermediary device.

30. The system of claim 18, wherein the computing device is a cloud based computing device infrastructure.

31. The system of claim 18, wherein the system issues notifications of recommended points of access for sub-activities at future times having the identified predictive gaps in usage in such a way that maximizes a number of the plurality of patrons engaging in each sub-activity of the plurality of sub-activities and minimizes a number of the plurality of patrons waiting to engage in usage of each sub-activity due to the sub-activity being utilized by other of the plurality of patrons.

* * * * *